US011924000B2

(12) United States Patent
Bhutani et al.

(10) Patent No.: US 11,924,000 B2
(45) Date of Patent: Mar. 5, 2024

(54) STATE RETENTION LOAD CONTROL SYSTEM

(71) Applicant: Lutron Technology Company LLC, Coopersburg, PA (US)

(72) Inventors: Ankit Bhutani, Aston, PA (US); Timothy Mann, Quakertown, PA (US); David T. Saveri, III, Nazareth, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/116,943

(22) Filed: Mar. 3, 2023

(65) Prior Publication Data

US 2023/0208668 A1 Jun. 29, 2023

Related U.S. Application Data

(63) Continuation of application No. 17/521,015, filed on Nov. 8, 2021, now Pat. No. 11,658,840, which is a (Continued)

(51) Int. Cl.
*H04L 12/28* (2006.01)
*E06B 9/322* (2006.01)
(Continued)

(52) U.S. Cl.
CPC ....... *H04L 12/2816* (2013.01); *H05B 39/041* (2013.01); *H05B 47/11* (2020.01);
(Continued)

(58) Field of Classification Search
CPC .... H05B 37/0272; H05B 37/02; H05B 41/36; H05B 47/19; H05B 47/11; H05B 47/105;
(Continued)

(56) References Cited

U.S. PATENT DOCUMENTS 5,248,919 A 9/1993 Hanna et al.
5,264,761 A 11/1993 Johnson et al.
(Continued)

FOREIGN PATENT DOCUMENTS

CN 2596671 Y 12/2003
CN 203233569 U 10/2013
(Continued)

*Primary Examiner* — Wei (Victor) Y Chan
(74) *Attorney, Agent, or Firm* — Flaster Greenberg P.C.

(57) ABSTRACT

A load control system may include control devices for controlling power provided to an electrical load. The control devices may include an input device and a load control device. The load control system may include a hub device. The hub device may include a communication circuit and a control circuit. The communication circuit may be configured to receive a digital message from the control device. The control circuit may be configured to determine, based on content of the digital message, whether the control device has experienced a power removal event. The hub device may send, via the communication circuit, a power removal event indication to the control device of whether the control device has experienced the power removal event.

18 Claims, 12 Drawing Sheets

Related U.S. Application Data continuation of application No. 16/945,462, filed on Jul. 31, 2020, now Pat. No. 11,196,581, which is a continuation of application No. 15/641,933, filed on Jul. 5, 2017, now Pat. No. 10,772,180.

(60) Provisional application No. 62/358,435, filed on Jul. 5, 2016.

(51) Int. Cl.

| | | |
|---|---|---|
| *E06B 9/68* | (2006.01) | |
| *H04L 67/10* | (2022.01) | |
| *H05B 39/04* | (2006.01) | |
| *H05B 47/11* | (2020.01) | |
| *H05B 47/115* | (2020.01) | |
| *H05B 47/14* | (2020.01) | |
| *H05B 47/19* | (2020.01) | |

(52) U.S. Cl.
CPC ............ *H05B 47/14* (2020.01); *H05B 47/19* (2020.01); *E06B 9/322* (2013.01); *E06B 9/68* (2013.01); *E06B 2009/6809* (2013.01); *H04L 67/10* (2013.01); *H05B 47/115* (2020.01)

(58) Field of Classification Search
CPC .... H05B 39/041; H02J 13/0017; H02J 3/005; H02J 3/00; H02J 9/00; H01H 9/54; H01H 3/02; H01H 35/00; G06F 1/26; H04B 5/0037; H04L 12/2816; H04L 67/10; E06B 9/68; E06B 2009/6809; E06B 9/322
See application file for complete search history.

(56) References Cited

U.S. PATENT DOCUMENTS

| | | | |
|---|---|---|---|
| 5,905,442 | A | 5/1999 | Mosebrook et al. |
| 6,803,728 | B2 | 10/2004 | Balasubramaniam et al. |
| 7,190,126 | B1 | 3/2007 | Paton |
| 7,834,856 | B2 | 11/2010 | Grinshpoon et al. |
| 7,936,281 | B2 | 5/2011 | Rigatti et al. |
| 8,009,042 | B2 | 8/2011 | Steiner et al. |
| 8,199,010 | B2 | 6/2012 | Sloan et al. |
| 8,228,184 | B2 | 7/2012 | Blakeley et al. |
| 8,330,638 | B2 | 12/2012 | Altonen et al. |
| 8,410,706 | B2 | 4/2013 | Steiner et al. |
| 8,451,116 | B2 | 5/2013 | Steiner et al. |
| 8,950,461 | B2 | 2/2015 | Ogden et al. |
| 9,115,537 | B2 | 8/2015 | Blair |
| 9,208,965 | B2 | 12/2015 | Busby et al. |
| 9,368,025 | B2 | 6/2016 | Carmen |
| 9,374,874 | B1 | 6/2016 | Ewing |
| 9,418,802 | B2 | 8/2016 | Romano et al. |
| 9,520,247 | B1 | 12/2016 | Finnegan et al. |
| 9,583,288 | B2 | 2/2017 | Jones et al. |
| 9,633,557 | B2 | 4/2017 | Twaddell et al. |
| 9,679,696 | B2 | 6/2017 | Bhutani et al. |
| 9,799,469 | B2 | 10/2017 | Bailey et al. |
| 9,851,735 | B2 | 12/2017 | Dolan et al. |
| 9,907,138 | B2 | 2/2018 | Wang et al. |
| 9,959,997 | B2 | 5/2018 | Bailey et al. |
| 10,027,127 | B2 | 7/2018 | Crafts et al. |
| 10,225,903 | B1 | 3/2019 | Fernandez |
| 10,271,407 | B2 | 4/2019 | Pessina et al. |
| 2007/0273509 | A1 | 11/2007 | Gananathan |
| 2008/0067871 | A1 | 3/2008 | Black et al. |
| 2008/0111491 | A1 | 5/2008 | Spira et al. |
| 2009/0167196 | A1 | 7/2009 | Wang et al. |
| 2009/0206983 | A1 | 8/2009 | Knode et al. |
| 2009/0302782 | A1 | 12/2009 | Smith et al. |
| 2011/0314163 | A1 | 12/2011 | Borins et al. |
| 2012/0013257 | A1 | 1/2012 | Sibert |
| 2012/0043889 | A1 | 2/2012 | Recker et al. |
| 2012/0261078 | A1 | 10/2012 | Adams et al. |
| 2012/0286940 | A1 | 11/2012 | Carmen et al. |
| 2012/0292174 | A1 | 11/2012 | Mah et al. |
| 2013/0030589 | A1 | 1/2013 | Pessina et al. |
| 2013/0214609 | A1 | 8/2013 | Carmen et al. |
| 2014/0001977 | A1 | 1/2014 | Zacharchuk et al. |
| 2014/0117871 | A1* | 5/2014 | Swatsky ................ H05B 47/10 315/246 |
| 2014/0132475 | A1 | 5/2014 | Bhutani et al. |
| 2014/0159588 | A1 | 6/2014 | So |
| 2014/0177469 | A1 | 6/2014 | Neyhart et al. |
| 2014/0180486 | A1 | 6/2014 | Newman et al. |
| 2014/0180487 | A1 | 6/2014 | Bull et al. |
| 2014/0231032 | A1 | 8/2014 | Blair et al. |
| 2014/0265568 | A1 | 9/2014 | Crafts et al. |
| 2014/0265881 | A1 | 9/2014 | Karc et al. |
| 2014/0265918 | A1 | 9/2014 | Cummings et al. |
| 2015/0005900 | A1 | 1/2015 | Steele et al. |
| 2015/0051717 | A1 | 2/2015 | Focht et al. |
| 2015/0077021 | A1 | 3/2015 | McCarthy et al. |
| 2015/0084547 | A1 | 3/2015 | Yeh et al. |
| 2015/0185751 | A1 | 7/2015 | Crafts et al. |
| 2015/0185752 | A1 | 7/2015 | Riedl et al. |
| 2015/0256028 | A1 | 9/2015 | Suman |
| 2016/0073479 | A1 | 3/2016 | Erchak et al. |
| 2016/0255698 | A1 | 9/2016 | Harbers et al. |
| 2016/0330825 | A1 | 11/2016 | Recker et al. |
| 2016/0353559 | A1 | 12/2016 | Mann et al. |
| 2016/0360597 | A1 | 12/2016 | Greene |
| 2017/0105176 | A1 | 4/2017 | Finnegan et al. |
| 2017/0223807 | A1 | 8/2017 | Recker et al. |
| 2017/0223808 | A1 | 8/2017 | Barna et al. |
| 2017/0279300 | A1 | 9/2017 | Catalano et al. |
| 2018/0014386 | A1 | 1/2018 | Bhutani et al. |
| 2018/0043130 | A1 | 2/2018 | Moore-Ede et al. |
| 2018/0190451 | A1 | 7/2018 | Scruggs |

FOREIGN PATENT DOCUMENTS

| | | |
|---|---|---|
| CN | 103476186 A | 12/2013 |
| CN | 103857146 A | 6/2014 |
| CN | 103906323 A | 7/2014 |
| CN | 104039035 A | 9/2014 |
| CN | 107949127 A | 4/2018 |
| EP | 2579691 A1 | 4/2013 |
| WO | 2018078027 A1 | 5/2018 |

\* cited by examiner

STATE RETENTION LOAD CONTROL SYSTEM

CROSS-REFERENCE TO RELATED APPLICATIONS

This application is a continuation of U.S. patent application Ser. No. 17/521,015, filed Nov. 8, 2021, which is a continuation of U.S. patent application Ser. No. 16/945,462, filed Jul. 31, 2020, which issued as U.S. Pat. No. 11,196,581 on Dec. 7, 2021. U.S. patent application Ser. No. 16/945,462 is a continuation of U.S. patent application Ser. No. 15/641,933, filed Jul. 5, 2017, which issued as U.S. Pat. No. 10,772,180 on Sep. 8, 2020. U.S. patent application Ser. No. 15/641,933, claims the benefit of U.S. Provisional Patent Application No. 62/358,435, filed Jul. 5, 2016. Each of U.S. patent application Ser. No. 17/521,015, U.S. patent application Ser. No. 16/945,462, U.S. patent application Ser. No. 15/641,933, U.S. Provisional Patent Application No. 62/358,435, U.S. Pat. Nos. 11,196,581, and 10,772,180, is incorporated by reference herein in its entirety.

BACKGROUND

A user environment, such as a residence or an office building, for example, may be configured using various types of load control systems. FIG. 1 depicts a prior art user environment 100. The user environment 100 includes a wall-mounted load control device 110 coupled in series electrical connection between an AC power source 102 and a light bulb 112 installed in a ceiling mounted downlight fixture 114. The user environment 100 includes a table lamp 124 plugged into an electrical receptacle 126 that is powered by the AC power source 102. The table lamp 124 is plugged into an electrical receptacle 126 via electrical plug 120. Light bulb 122 is installed in table lamp 124. The wall-mounted load control device 110 has an electronic switch (e.g., light switch 116). In response to actuation of the light switch 116, the wall-mounted load control device 110 is configured to turn the light bulb 112 on and off.

The user environment 100 includes a battery-powered handheld remote control device 150 having buttons 152. The battery-powered remote control device 150 transmits RF signals 106 in response to actuations of one or more of the buttons 152. The light bulb 112 and light bulb 122 receive digital messages via radio-frequency (RF) signals 106. The RF signals 106 are transmitted by the battery-powered remote control device 150. In response to the received RF signals, the light bulb 112 and/or light bulb 122 turn on and off.

The user environment may include a bridge and a smartphone or tablet for controlling the light bulbs 112, 122. The bridge transmits RF signals to the light bulbs 112, 122. The bridge receives Wi-Fi signals from the smartphone or tablet for controlling the light bulbs 112, 122 and formats the information in the Wi-Fi signals for being received by the light bulbs 112, 122 on a different protocol.

In user environment 100, a problem arises if power is removed from the light bulb 112 and/or the light bulb 122. The problem arises whether or not a bridge is present in the user environment 100. For example, if power is removed from the light bulbs and returns to the light bulbs, the light bulbs turn on to a default intensity level (e.g., 100% intensity level). As an example, the light bulb 112 may be set to electronic off and the light bulb 122 may be set to an intensity level of eighty percent. Power may intentionally be removed from the light bulb 112 via an actuation of the light switch 116 to the off position. As another example, power may unintentionally be removed from the light bulb 112 and/or the light bulb 122 due a blackout or a brownout. Upon power being returned to the light bulb 112 and the light bulb 122, the light bulb 112 and light bulb 122 may present light at the default intensity (e.g., an intensity level of 100%). During unintentional power removal, it may be undesirable to a user for the light bulb 112 and light bulb 122 to present light at the default intensity. Rather, during an unintentional power removal, the user may desire that the intensity of the light bulbs be returned to their respective pre-power removal states (e.g., electronic off and eighty percent, respectively). For example, during an unintentional power removal, a user may not desire the light bulb 112 and/or the light bulb 122 to operate at the default state of full intensity when the user is asleep or when the user is away from the user environment 100 for an extended period of time. Accordingly, there is a need for the control system to distinguish between an intentional power removal event (based on a user action) and an unintentional power removal event (such as a blackout), so that the light bulbs may behave in an expected manner.

SUMMARY

A load control system may include control devices for controlling an amount of power provided to an electrical load. The control devices may include an input device and/or a load control device. The load control devices may be capable of directly controlling an electrical load. The input devices may be capable of indirectly controlling the electrical load via the load control device. For example, the load control device may be capable of controlling the amount of power provided to the electrical load based on digital messages received from the input device and/or another device. The digital messages may include load control instructions or another indication that causes the load control device to determine load control instructions for controlling an electrical load.

The control devices may be powered from a power source (e.g., alternating-current (AC) or direct-current (DC) power source). If an inadequate amount of power is provided to the control devices, the control devices may stop functioning. An inadequate amount of power may occur as a result of a power outage (e.g., a blackout, brownout, or other power loss). For example, during a brownout, a control device powered by an AC circuit may be inoperable. Although control devices may receive an inadequate amount of electric power as a result of power outages, control devices may also, or, alternatively, receive an inadequate amount of power in other ways. For example, control devices may receive an inadequate amount of power as a result of a user action, such as the user turning a light switch off that powers control devices or unplugging a power cord that powers the control devices. Power removal events as a result of power outages may be referred to as system power removal events. Power removal events as a result of user actions may be referred to as local power removal events.

A control device may be configured to be controlled to and retain one or more states (e.g., power states). The control device may include memory. The memory may be volatile and/or non-volatile memory. The memory may be used for saving a power state of the control device. A power state of the control devices may include an off power state of the control device, an on power state of the control device, an intensity state (e.g., an intensity level) of the control device, a color (e.g., a color temperature) state of the control device, etc. For example, the control device may store in memory that the power state of a control device is an intensity state of eighty-percent. The power state may be recalled at a later time. For example, a prior power state (e.g., a power state of a control device prior to a power removal event) may be recalled by the control device after the power removal event ends. For example, after a power removal event, a control device may recall that the prior power state of the control device was a particular intensity level, such as eighty-five percent. The control device may recall (e.g., from memory within the control device) the prior power state of the control device, for example, when the power removal event ends. A lighting device, for example, may be set to forty percent prior to a power removal event. Upon the power removal event occurring and the power removal event ending, the control device may recall (e.g., from the memory within the control device) that the prior power state of the lighting device was forty percent. Thus, upon the power removal event ending, the lighting device may function at an intensity of forty percent.

A hub device may communicate with one or more control devices. For example, a hub device may communicate with control devices via a wireless and/or wired signal. The hub device may provide command instructions (e.g., power on, power off, set to an intensity level, set to a color temperature, etc.) to the control devices. The hub device may be electrically coupled with a power source (e.g. an AC power source). For example, the hub device may be electrically coupled with a power source, and/or the hub device may be configured to determine the status (e.g., on, off, etc.) of electrical power being distributed from the power source in which the hub device is electrically coupled. The hub device may be electrically coupled with a power source that is electrically coupled with control devices. The hub device may determine the status (e.g., on, off, etc.) of electrical power that the power source is providing to the control devices, and/or the hub device may determine the status of electrical power that the power source is providing to the hub device. For example, the hub device may determine if, and/or when, electrical power is no longer being provided by an AC power source to a control device. The hub device may also, or, alternatively, determine if, and when, electrical power is no longer being provided to the hub device.

The hub device may be able to determine whether a power removal event (e.g., a blackout, brownout, loss of power, etc.) is a local power removal event. A local power removal event may occur as a result of a user turning an electrical switch to the off position. For example, a user may turn an electrical switch to an off position in an attempt to turn off the power and/or functionality of a corresponding control device. A local power removal event may include a power removal event occurring to a single control device, and/or a power removal event occurring to one or more control devices located within a predefined location (e.g., one or more control devices located within a room). The hub device may be able to determine whether a power removal event is a system power removal event (e.g., a blackout, brownout, etc.). A system power removal event may include a power removal event occurring to one or more control devices within one or more locations. A system power removal event may include a power removal event occurring to the hub device and one or more control devices within one or more locations. A system power removal event, for example, may include a power removal event occurring to five control devices located within three rooms. A system power removal event may occur as a result of a blackout, brownout, other losses of power, etc.

The hub device may include memory. The memory of the hub device may be volatile and/or non-volatile memory. The memory may be used for saving a power state of one or more of the control devices with which the hub device communicates. A power state of the control devices may include an off power state of the control devices, an on power state of the control devices, an intensity level of the control device, a color temperature of the control device, etc. For example, the hub device may store in memory that the power state of one of the control devices is functioning at an eighty-percent intensity level, and another one of the control devices may be functioning at a forty percent intensity level. The power states of the control devices may be recallable (e.g., at a later time) by the hub device. For example, in the event of a power removal event (e.g., in the event of a blackout, brownout, other form of power loss, etc.), the hub device may recall the prior power states of one or more of the control devices.

Upon a power removal event, the hub device may recall that the power state of one of the control devices was at an intensity level of eighty-five percent, and the power state of another one of the control devices was at an intensity level of forty percent. Upon the power removal event ending (e.g., the blackout, brownout, other power loss, etc., ending), the hub device may communicate (e.g., communicate to the control devices) the prior power state of the control devices. For example, the hub device may communicate to one of the control devices that the prior power state of the control device was an intensity level of eighty-five percent, and the hub device may communicate to another one of the control devices that the prior power state of that control device was an intensity level of forty percent. After the end of the power removal event, the control devices may function according to the state (e.g., the prior power removal event state) provided to the respective control devices by the hub device. Thus, after power is restored to the control devices, the control devices may turn on to an intensity level of eighty-five percent and forty percent, respectively.

The hub device may communicate (e.g., send a digital message) with control devices according to a predefined dataset. The predefined dataset may be based on a location of the control devices, a predefined signal threshold, a priority of the control devices, etc. For example, upon determining that a power removal event has occurred, the hub device may send signals to control devices located within a location (e.g., located within a bedroom, within a conference room, within an entire building, etc.). Upon determining that a power removal event has occurred, the hub device may also, or, alternatively, broadcast a signal to each control device within a predefined signal threshold. The signal threshold may correspond to the transmitting signal and/or the signal threshold may correspond to a receiving signal.

The hub device may transmit an indication to the control devices of whether a power removal event (e.g., a brownout, blackout, etc.) has occurred. The indication may include whether the power removal event was a local power removal event or whether the power removal event was a system power removal event. The indication of the power removal event may include the time of the power removal event and/or the duration of the power removal event. The hub device may query one or more of the control devices to determine whether the control devices have experienced and/or are experiencing a power removal event. For example, the hub device may ask one or more of the control devices whether they are receiving power from an AC power source. The hub device may determine whether the power removal event is a local power removal event or a system power removal event, based on, for example, whether one or more of the control devices have experienced and/or are experiencing a power removal event.

Upon the power removal event ending, the hub device may send information (e.g., power removal event information, power state information, etc.) to the control devices. The hub device may send the information to the control devices based on whether the power removal event was a system power removal event or a local power removal event. For example, the hub device may send power state information to a control device in the event of a system power removal event and/or the hub device may not send power state information to a control device in the event of a local power removal event. The hub device may also, or alternatively, send power state information to a control device, independent of the type of power removal event that has occurred.

A load control device (e.g., wall-mounted load control device) may be coupled to an external device. The external device may be a retrofit device. For example, a wall-mounted load control device may be coupled to a dimmer device, a remote control device, etc. The external device may be configured to retain the power state of control devices (e.g., lighting devices). For example, the external device may be configured to retain the power state of the control devices to an on power state. The external device may be configured to retain an intensity level of a light bulb to a non-zero value (e.g., an intensity level of 1%-100%). The external device may retain the power state of the light bulb to an on power state, for example, by physically maintaining electrical continuity of the circuit (e.g., AC circuit) between an AC power source and the light bulb.

A control device coupled to the external device may not experience a local power removal event. For example, because the external device retains the power state of the control device to an on power state, the control device may not be turned off by a user. Even when the external device is actuated to its lowest state, or electronic off, the light bulb may continue to draw some power (e.g., about the amount of power to provide a 1% intensity level) from the control device. A control device in a control system coupled the external device may experience a system power removal event. For example, a control device (e.g., a light bulb coupled to the external device) may experience a blackout. Because the external device prevents a local power removal event, a power removal event experienced by the control device coupled to the external device may be determined to be a system power removal event.

Another control device may receive electrical power from an electrical receptacle which is not coupled to the external device. Because control device is not coupled to the external device, the power removal event to the control device may be determined to be a local power removal event and/or the power removal event to the control device may be determined to be a system power removal event. To determine whether a power removal event is a local power removal event or a system power removal event, the power states of one or more control devices may be determined. For example, if a first control device is experiencing a power removal event and a second control device is experiencing a power removal event, it may be determined that the power removal event is a system power removal event. If the first control device is experiencing a power removal event and control devices positioned within one or more rooms are experiencing a power removal event, it may be determined that the power removal event is a system power removal event. If the first control device is experiencing a power removal event and the second control device is not experiencing a power removal event, and vice-versa, it may be determined that the power removal event is a local power removal event.

Upon the control devices and/or other devices (e.g., hub device) determining that the power removal event is a system power removal event, the control devices and/or other devices may adjust the power state of the control devices upon the power removal event ending. For example, upon the power removal event ending, the control devices and/or other devices may adjust the power state of the control devices to the prior power states of the control devices. For example, upon the control devices and/or other devices determining that the power removal event is a system power removal event, the control devices and/or other devices may obtain the prior power states of the control devices (e.g., via memory). The control devices and/or other devices may send and/or set the power states of the control devices to the obtained prior power states of the control devices.

DETAILED DESCRIPTION

Figure 1:
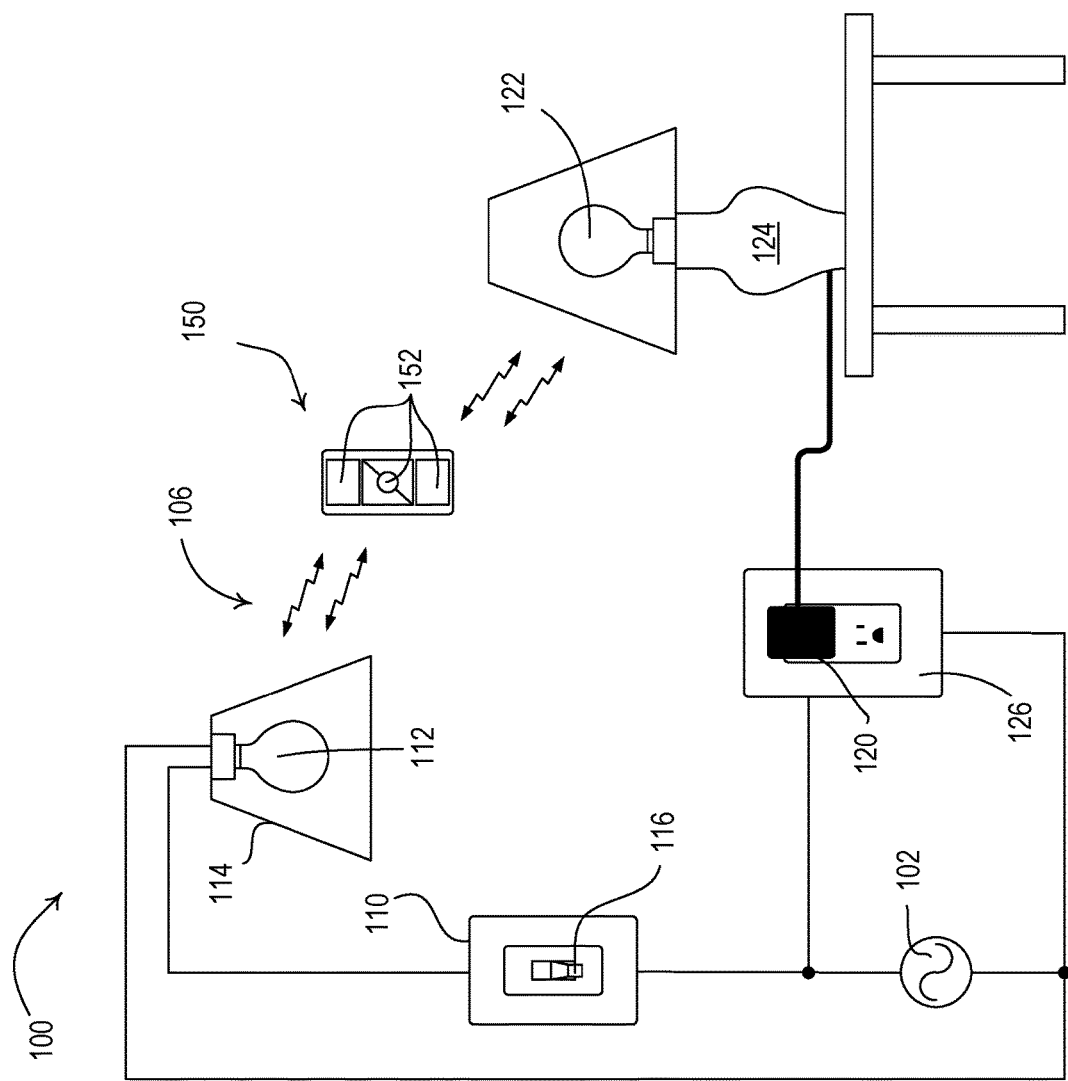
FIG. 1 is an example prior art environment including load control devices.
Figure 2A:
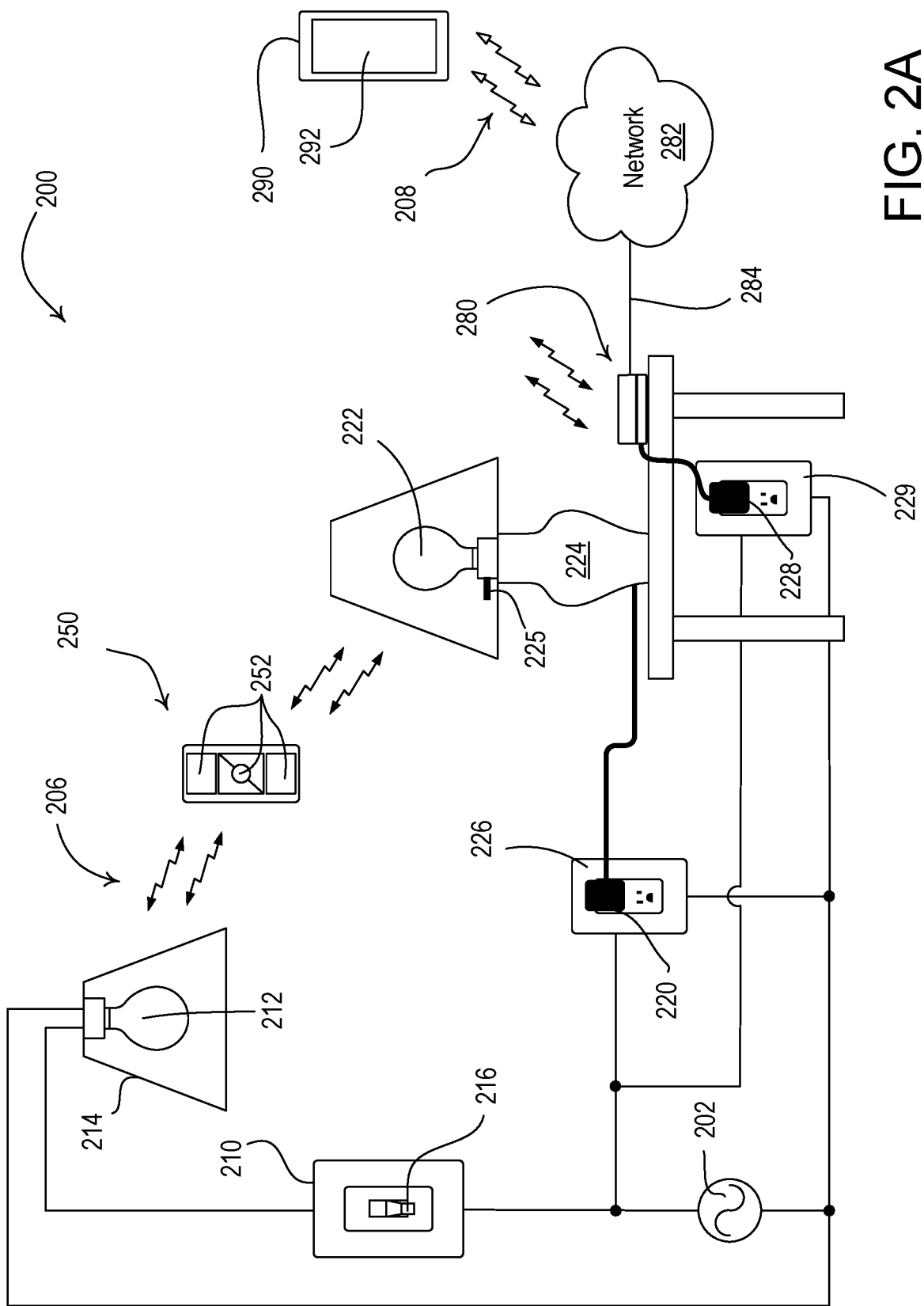
FIGS. 2A-2D are perspective views of example environments for adjusting and/or retaining state information of control devices.

FIG. 2A is a diagram of an example load control system 200 (e.g., a lighting control system) in which one or more lighting devices, such as wirelessly-controllable light bulbs 212, 222 (e.g., lighting loads) may be deployed. The load control system 200 may comprise a wall-mounted load control device 210 (e.g., a mechanical switch, such as, a toggle switch, a paddle switch, a pushbutton switch, a "light switch," or other suitable switch), which may be coupled in series electrical connection between an alternating-current (AC) power source 202 and the first light bulb 212. The light bulb 212 may be installed in a ceiling-mounted downlight fixture 214. In addition, the light bulb 212 may be installed in a wall-mounted lighting fixture or other lighting fixture mounted to another surface. The wall-mounted load control device 210 may include an actuator (e.g., a toggle actuator 216) for controlling the power delivered to the light bulb 212. In response to actuations of the toggle actuator 216, the wall-mounted load control device 210 may be configured to turn the light bulb 212 on and off. Because the wall-mounted load control device 210 may be configured to turn the light bulb 212 on and off (e.g., the light bulb 212 is downstream of the wall-mounted load control device 210), the light bulb 212 may be considered to be a switched electrical device. The wall-mounted load control device 210 may be adapted to be wall-mounted in a standard electrical wallbox.

The second light bulb 222 may be installed in a lamp (e.g., a table lamp 224). The table lamp 224 may be plugged into (e.g., via electrical plug 220) an electrical receptacle 226 that is powered by the AC power source 202. The light bulb 222 may be installed in the table lamp 224 or other lamp that may be plugged into the electrical receptacle 226. The table lamp 224 may comprise an internal switch (not shown) coupled in series between the AC power source 202 and the light bulb 222. The table lamp 224 may also include an actuator 225 for controlling the internal switch to control the power delivered to the light bulb 222. In response to actuations of the actuator 225 of the table lamp 224, the internal switch of the table lamp 224 may be configured to turn the light bulb 222 on and off. Because the internal switch of the table lamp 224 may be configured to turn the light bulb 222 on and off (e.g., the light bulb 222 is downstream of the internal switch of the table lamp 224), the light bulb 222 may be considered to be a switched electrical device.

The load control system 200 may include one or more input devices, e.g., radio-frequency (RF) transmitters, such as a battery-powered handheld remote control device 250. The light bulb 212 and/or the light bulb 222 may be configured to receive digital messages via wireless signals, e.g., radio-frequency (RF) signals 206 (e.g., ZIGBEE®; NFC; BLUETOOTH®; WI-FI®; or a proprietary communication channel, such as CLEAR CONNECT™, etc.). The wireless signals may be transmitted by the battery-powered remote control device 250. In response to the received digital messages, the respective light bulbs 212, 222 may be turned on and off, and/or the intensities of the respective light bulbs 212, 222 may be increased or decreased. The battery-powered remote control device 250 may include one or more actuators 252 (e.g., one or more of an on button, an off button, a raise button, a lower button, or a preset button). The battery-powered remote control device 250 may transmit the RF signals 206 in response to actuations of one or more of the actuators 252. The battery-powered remote control device 250 may be handheld. The battery-powered remote control device 250 may be mounted vertically to a wall, or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHT-LIGHT, the entire disclosures of which are hereby incorporated by reference.

Digital messages transmitted by the input devices (e.g., the battery-powered remote control device 250) may include a command and/or identifying information, such as a serial number (e.g., a unique identifier) associated with the transmitting input device. Each of the input devices may be associated with (e.g., assigned to) the light bulb 212 and/or the light bulb 222 during a configuration procedure of the load control system 200, such that the light bulb 212 and/or the light bulb 222 may be responsive to digital messages transmitted by the input devices via the RF signals 206. Examples of associating wireless control devices during a configuration procedure are described in greater detail in commonly-assigned U.S. Patent Application Publication No. 2008/0111491, published May 15, 2008, entitled RADIO-FREQUENCY LIGHTING CONTROL SYSTEM, and U.S. Pat. No. 9,368,025, issued Jun. 14, 2016, entitled TWO-PART LOAD CONTROL SYSTEM MOUNTABLE TO A SINGLE ELECTRICAL WALLBOX, the entire disclosures of which are hereby incorporated by reference.

The load control system 200 may include a hub device 280 configured to enable communication with a network 282, e.g., a wireless or wired local area network (LAN). The hub device 280 may be connected to a router via a wired digital communication link 284 (e.g., an Ethernet communication link). The router may allow for communication with the network 282, e.g., for access to the Internet. The hub device 280 may be wirelessly connected to the network 282, e.g., using wireless technology, such as Wi-Fi technology, cellular technology, etc. The hub device 280 may be configured to transmit communication signals (e.g., RF signals 206) to the light bulb 212 and/or the light bulb 222 for controlling the respective light bulbs in response to digital messages received from external devices via the network 282. The hub device 280 may communicate via one or more types of RF communication signals (e.g., ZIGBEE®; NFC; BLUETOOTH®; WI-FI®; cellular; a proprietary communication channel, such as CLEAR CONNECT™, etc.). The hub device 280 may be configured to receive RF signals 206 from the battery-powered remote control device 250, the light bulb 212, and/or the light bulb 222 (e.g., using ZIGBEE®; NFC; BLUETOOTH®; or a proprietary communication channel, such as CLEAR CONNECT™, etc.). The hub device 280 may be configured to transmit digital messages via the network 282 for providing data (e.g., status information) to external devices.

The hub device 280 may operate as a central controller for the load control system 200, and/or relay digital messages between the control devices (e.g., lighting devices) of the load control system and the network 282. The hub device 280 may be plugged into (e.g., via electrical plug 228) an electrical receptacle 229 that is powered by the AC power source 202. The hub device 280 may receive power without being controlled by the same actuator as the light bulbs 212, 222 (e.g., without being controlled by the toggle actuator 216). For example, toggle actuator 216 may not turn the hub device 280 on and off. The hub device 280 may receive power from an external power source. For example, the hub device 280 may receive power from a battery. The hub device 280 may be on-site at the load control system 200 or at a remote location. Though the hub device 280 is shown as a single device, the load control system 200 may include multiple hub devices and/or the functionality thereof may be distributed across multiple devices.

The load control system 200 may include a network device 290, such as, a smart phone (for example, an iPhone® smart phone, an Android® smart phone, or a Blackberry® smart phone), a personal computer, a laptop, a wireless-capable media device (e.g., MP3 player, gaming device, or television), a tablet device, (for example, an iPad® handheld computing device), a Wi-Fi or wireless-communication-capable television, or any other suitable network communication or Internet-Protocol-enabled device. The network device 290 may be operable to transmit digital messages in one or more Internet Protocol packets to the hub device 280 via RF signals 208 either directly or via the network 282. For example, the network device 290 may transmit the RF signals 208 to the hub device 280 via a Wi-Fi communication link, a Wi-MAX communications link, a Bluetooth® communications link, a near field communication (NFC) link, a cellular communications link, a television white space (TVWS) communication link, or any combination thereof. The RF signals 208 may be communicated using a different protocol and/or wireless band than the RF signals 206. For example, the RF signals 208 may be configured for Wi-Fi communication or cellular communication, while RF signals 206 may be configured for ZIG- BEE® or a proprietary communication channel, such as CLEAR CONNECT™. In another example, the RF signals 208 and the RF signals 206 may be the same. Examples of load control systems operable to communicate with network devices on a network are described in greater detail in a commonly-assigned U.S. Pat. No. 10,271,407, issued Apr. 23, 2019, entitled LOAD CONTROL DEVICE HAVING INTERNET CONNECTIVITY, the entire disclosure of which is hereby incorporated by reference.

The network device 290 may include a visual display 292. The visual display 292 may include a touch screen that may include, for example, a capacitive touch pad displaced overtop the visual display, such that the visual display may display soft buttons that may be actuated by a user. The network device 290 may include a plurality of hard buttons, e.g., physical buttons (not shown), in addition to the visual display 292. The network device 290 may download a product control application for allowing a user of the network device 290 to control the load control system 200. In response to actuations of the displayed soft buttons and/or hard buttons, the network device 290 may transmit digital messages to the light bulb 212, the light bulb 222, and/or the hub device 280 through the wireless communications described herein.

The network device 290 may transmit digital messages via the RF signals 208 for controlling the light bulb 212 and/or the light bulb 222. The network device 290 may transmit digital messages to the light bulb 212 and/or the light bulb 222 via the hub device 280 (e.g., using ZIGBEE®; NFC; BLUETOOTH®; or a proprietary communication channel, such as CLEAR CONNECT™, etc.). For example, the network device 290 may transmit digital messages to turn the light bulbs 212, 222 on, off, and/or modify the intensities of respective light bulbs 212, 222. The network device 290 may vary the intensity of the light bulbs 212, 222 by varying the amount of power delivered to the light bulbs 212, 222. For example, the network device 290 may increase or decrease the intensity of the light bulbs 212, 222 from a minimum intensity (e.g., approximately 1%) to a maximum intensity (e.g., approximately 100%). The light bulb 212 and/or the light bulb 222 may communicate with the hub device via RF signals 206 (e.g., to transmit status information). For example, the light bulb 212 and/or the light bulb 222 may be configured to communicate with the hub device 280 (e.g., using ZIGBEE®; NFC; BLUETOOTH®; or a proprietary communication channel, such as CLEAR CONNECT™, etc.) in response to digital messages received from the battery-powered remote control device 250 and/or another cause of change in lighting intensity. The hub device 280 may be configured to transmit RF signals 208 to the network device 290. For example, the RF signals 208 transmitted to the network device 290 may be used for displaying data (e.g., status information) on the visual display 292 of the network device 290.

The operation of the load control system 200 may be programmed and configured using the hub device 280 and/or the network device 290. An example of a configuration procedure for a wireless load control system is described in greater detail in commonly-assigned U.S. Pat. No. 10,027,127, issued Jul. 17, 2018, entitled COMMISSIONING LOAD CONTROL SYSTEMS, the entire disclosure of which is hereby incorporated by reference.

The lighting devices (e.g., the light bulb 212, the light bulb 222) may include an ability to store information. For example, the light bulb 212 and/or the light bulb 222 may include memory. The memory may be volatile and/or non-volatile memory. The memory may be used for saving one or more states (e.g., power states) of the lighting devices. For example, the light bulb 212 and/or the light bulb 222 may have an on power state and/or an off power state. The on power state of the light bulb 212 and/or the light bulb 222 may be characterized by an intensity state, a color (e.g., a color temperate) state, etc. The intensity state of the light bulb 212 and/or the light bulb 222 may be the intensity level (e.g., 10%, 50%, 80%) of the light bulb 212 and/or the light bulb 222. The light bulbs 212, 222 may be configured to store their respective states in memory. Also, or alternatively, the light bulbs 212, 222 may be configured to store states of other devices in their respective memory. The light bulbs 212, 222 may store one or more power states for retention at a later time.

If the hub device 280 is included in the load control system 200, the hub device 280 may store information. For example, the hub device 280 may include memory that may be volatile and/or non-volatile memory. The memory may be used for saving one or more states (e.g., power states) of the lighting devices and/or one or more states of the hub device 280. For example, the hub device 280 may have a powered state when receiving power and an unpowered state when insufficient power is being received. The hub device 280 may store the power states of the lighting devices and/or the power states of the hub device 280. The hub device 280 may store the intensity states and/or color states of the lighting devices. The hub device 280 may store the power states of lighting devices for retention at a later time.

The hub device 280 may be used to set a state (e.g., power state) of one or more of the lighting devices of the load control system 200 (e.g., the light bulb 212, the light bulb 222). For example, the hub device 280 may be used to set the state of one or more of the lighting devices to an on power state, an off power state, a defined intensity state (e.g., a preset intensity state), a defined color state, etc. The lighting devices may be in the on power state to be controlled to other states, such as the defined intensity state or the defined color state, for example. The lighting devices may change their respective states to be aligned with the states provided by the hub device 280. The hub device 280 may change the states of the lighting devices to be aligned with the states stored by the hub device 280 when electrical power is being provided to the lighting devices. For example, the hub device 280 may set a state of the light bulb 212 to an on power state. If power is being provided to the light bulb 212 (e.g., the toggle actuator 216 is turned to the on position), the light bulb 212 may be turned to the on power state. If electrical power is not provided to the lighting load (e.g., a power removal event occurs, such as the toggle actuator 216 is turned to the off position), the hub device 280 may not be able to set the light bulb 212 to the on power state and/or to a defined intensity or color. For example, the hub device 280 may be precluded from setting the state of the light bulb 212 to the on power state or to a defined intensity or color if insufficient electrical power is being provided to the light bulb 212 (e.g., a power removal event occurs, such as the toggle actuator 216 is turned to the off position). The hub device 280 may set a state of the light bulb 212 to the off power state. For example, if power is being provided to the light bulb 212 (e.g., the toggle actuator 216 is turned to the on position), the hub device 280 may set the power state of the light bulb 212 to the off power state, based on the information stored by the hub device 280. The network device 290 may be used to set a state (e.g., power state), or not set a state, of one or more lighting devices in a manner similar to the hub device 280.

The hub device 280 and/or the network device 290 may set a state (e.g., a power state) of one or more lighting devices by sending a digital message to the light bulbs 112, 122. The hub device 280 and/or the network device 290 may send the digital messages directly to the light bulbs 112, 122. The hub device 280 and/or the network device 290 may send the digital messages to the light bulbs 112, 122 via an intermediary device (e.g., via a separate hub device, network device, and/or control device). The digital message may include the power state to which the lighting devices may be set. The light bulbs 112, 122 may set the respective lighting devices to the received power state. The light bulbs 112, 122 may store the received power state. The light bulbs 112, 122 may transmit a digital message to the hub device 280 and/or the network device 290. For example, the light bulbs 112, 122 may transmit a digital message to the hub device 280 and/or the network device 290 as an acknowledgement that the light bulbs 112, 122 have received and/or stored the power state sent by the hub device 280 and/or the network device 290.

The hub device 280 may monitor when the remote control device 250 changes the power state of the lighting devices and update the power states that are stored in memory. The hub device 280 may identify digital messages from the remote control device 250 that are transmitted to control the power state of the lighting devices. In response to the hub device 280 identifying a command to change the power state in the digital messages transmitted from the remote control device 250, the hub device 280 may update the power states stored in memory. The hub device 280 may await a confirmation of the change in power state from the lighting devices before updating the stored power state.

A power state as set by the hub device 280 and/or the network device 290 may be different than the actual state of the lighting devices (e.g., light bulb 212). As described herein, the hub device 280 and/or the network device 290 may be configured to set a power state of the lighting devices (e.g., the light bulb 212). For example, the hub device 280 and/or the network device 290 may set a power state of the light bulb 212 to an on power state. As long as electrical power is provided to the lighting devices, the lighting devices may set their respective power states to the power states provided by the hub device 280 and/or the network device 290. The power states (e.g., on power states) may be overridden by a power removal event during which the actual states of the lighting devices may be different than the power states stored by the hub device 280 and/or the network device 290. For example, if power is removed from the lighting load via a power removal event, the light bulb 212 may be in an off power state. A power removal event may include a user turning the toggle actuator 216 to the off position. For example, if a user turns the toggle actuator 216 to the off position, the light bulb 212 may be turned to an off power state, even if the hub device 280, the network device 290, and/or the remote control device 250 has set the power state of the light bulb 212 to the on power state.

A power removal event may also include a power outage (e.g., a blackout and/or a brownout). For example, power may be removed from the lighting devices if one or more portions (e.g., rooms) of a load control system 200 experiences a blackout, brownout, etc. If power is removed from the light bulb 212 (e.g., via a power removal event, such as a blackout), the light bulb 212 may be turned to an off power state, notwithstanding that the hub device 280, the network device 290, and/or remote control device 250 has set the power state of the light bulb 212 to be an on power state.

The prior power states (e.g., the power states of lighting devices set prior to a power removal event) may be stored by the light bulb 212, the light bulb 222, the hub device 280, the network device 290, and/or stored in an external database (e.g., cloud database) via the network 282. The prior power states of lighting devices may be recalled at a predefined time. The prior power states of the lighting devices may be recalled after a predetermined event (e.g., upon a user action).

A power removal event may be a local power removal event or a system power removal event. A local power removal event may occur as a result of a user controlling the toggle actuator 216 and/or the actuator 225 to an off position. For example, a user may actuate the toggle actuator 216 and/or the actuator 225 in an attempt to turn off the power and/or functionality of the respective light bulbs 212, 222. A single control device or multiple control devices located within a location (e.g., one or more control devices located within a room or controlled by the same switch) may experience a local power removal event. A system power removal event may be a blackout, brownout, or other power removal event that affects the devices in the load control system 200. The hub device 280 may be able to determine whether a power removal event is a system power removal event (e.g., a blackout, brownout, etc.). A system power removal event may involve the removal of power to the hub device 280 and one or more control devices within the load control system 200. In response to the system power removal event, the hub device 280 may operate in an unpowered state (e.g., powered off). The hub device 280 may enter a battery powered mode after detecting the loss of power, or may remain off until the return of power from the AC circuit. The hub device 280 may detect a return to the powered state and may subsequently control the light bulbs 212, 222 to a prior power state (e.g., prior to the loss of power). The light bulbs 212, 222 may also, or alternatively, store their prior power states locally and recall the prior power states after a system power removal event is detected (e.g., via an indication from the hub device 280).

After the lighting devices (e.g., light bulbs 212, 222) and/or the hub device 280 determines that the power removal event is a local power removal event at one of the lighting devices (e.g., the user turning off power to an AC circuit), the lighting devices and/or the hub device 280 may refrain from transmitting a prior power state. After a local power removal event has ended and power is returned to the lighting devices affected by the local power removal event (e.g., the user turning on the power to the AC circuit), lighting devices affected by the local power removal event may turn on to a default intensity level (e.g., maximum intensity level, a defined intensity level, such as eighty-five percent, etc.) or to a prior intensity level. The hub device 280 and/or other lighting devices may refrain from transmitting messages to detect whether a power removal event has occurred and/or from controlling the power state of the affected lighting devices. For example, after the light bulb 222 and/or the hub device 280 determines that a power removal event to the light bulb 212 was a local power removal event (e.g., because toggle actuator 216 was actuated to the off position), the light bulb 222 and/or the hub device 280 may refrain from transmitting a digital message to control the power state of the light bulb 212.

After the lighting devices and/or the hub device 280 determines that the power removal event is a system power removal event (e.g., a brownout, blackout, etc.), the lighting devices and/or the hub device 280 may modify the power states of the lighting devices to the prior power states of the lighting devices. For example, upon the light bulbs 212, 222 and/or the hub device 280 determining that the power removal event to the light bulbs 212, 222 is a system power removal event (e.g., by determining that the light bulb 212 and the light bulb 222 have experienced a power removal event), the light bulbs 212, 222 and/or the hub device 280 may set the power state of the lighting devices to the respective prior power states. Thus, in the event of a system power removal event, the light bulbs 212, 222 may be prevented from operating at an undesirable default intensity level (e.g., maximum intensity level, a defined intensity level, such as eighty-five percent, etc.) when power is returned to the light bulbs 212, 222, and may even remain in an off power state when that is the prior power state of the light bulbs 212, 222 before the system power removal event.

In an example, the light bulb 212 may be in the off power state (e.g., zero percent intensity level), but still receiving power from the AC power source 202. If the light bulb 212 experiences a local power removal event, and power is returned to the light bulb 212, the light bulb 212 may turn on to a default intensity level, such as a maximum intensity level or a defined intensity level, e.g., eighty-five percent. If the light bulb 212 experiences a system power removal event, and the hub device 280 is implemented in the system 200, the hub device 280 may detect the system power removal event and send a digital message that overrides the default intensity level of the light bulb 212 with the stored prior power state (e.g., zero percent intensity level) of the light bulb 212 before the system power removal event. If the light bulb 212 stores the prior power state (e.g., zero percent intensity level) of the light bulb 212 locally and detects that a system power removal event has occurred, the light bulb 212 may override the default power state with the prior power state of the light bulb 212 before the system power removal event and remain in the off power state (e.g., zero percent intensity level). In the examples provided, the light bulb 212 may remain off, or return to another prior power state, in the event of a system power removal event.

The lighting load of the light bulb 212 may operate at the recalled prior power state at a predefined time and/or the lighting load of the light bulb 212 may function according to the recalled prior power state after a predefined duration (e.g., five minutes after the power is returned to the lighting load and/or immediately after the power is returned to the lighting load). For example, upon a system power removal event beginning and ending, the light bulb 212 may recall (e.g., from memory) that the prior power state of the lighting load was an on power state at an intensity state of eighty percent. Upon the power removal event ending, the light bulb 212 may operate the lighting load in the on power state at the intensity state of eighty percent. The lighting load may function at eighty percent in the morning, and/or the lighting load may function at the defined intensity upon a predefined duration (e.g., ten minutes, immediately, etc.) after the power removal event ends.

Other devices (e.g., the hub device 280 and/or the network device 290) within the load control system 200 may be used to coordinate the storage and/or retrieval of power states of lighting devices. The hub device 280 and/or the network device 290 may be used to store power states of lighting devices prior to a power removal event (e.g., as the prior power states). The hub device 280 and/or the network device 290 may coordinate sending messages, such as messages including power states, among lighting devices. A button (e.g., a "soft" button) on the network device 290 may be actuated to set lighting devices to predefined power states. For example, a button on the network device 290 may be actuated to set the light bulb 212 to a power state of forty percent intensity level. Upon the conclusion of a power removal event, the light bulb 212 may be set to the power state set by the network device 290 (e.g., an intensity level of forty percent). The light bulb 212 may retrieve the intensity level of forty percent internally (e.g., from memory within the light bulb 212) and/or the light bulb 212 may retrieve the intensity level of forty percent externally (e.g., from the hub device 280, the network device 290 and/or one or more other lighting devices).

The prior power state may be pushed to the light bulb light bulbs 212, 222 after the identification of the end of the power removal event without the light bulbs 212, 222 sending a request. For example, the hub device 280 and/or the network device 290 may send a digital message to the light bulb 212 that indicates a prior power state to which the light bulbs 212, 222 may each be controlled after the hub device 280 and/or the network device 290 detect the end of a power removal event (e.g., by detecting a change from a powered state to an unpowered state, and back to a powered state).

The hub device 280 and/or the network device 290 may detect the occurrence of a power removal event (e.g., by detecting a change from a powered state to an unpowered state, and back to a powered state) and query the light bulbs 212, 222 to determine whether the light bulbs 212, 222 also experienced the power removal event. The query may include a time or timeframe within which the power removal event was detected at the hub device 280 and/or the network device 290. The time may be a time at which the power removal event began and/or the time at which the power removal event ended. The query may include a device identifier (e.g., unique identifier) of the devices that are intended to respond to the query. The light bulbs 212, 222 may acknowledge whether a power removal event was experienced by transmitting an acknowledgement message to the hub device 280 when the light bulbs 212, 222 experienced the power removal event. The acknowledgement message may include the time and/or timeframe in which the power removal event was detected at the respective light bulbs 212, 222, such that the hub device 280 and/or the network device 290 may determine whether the power removal events coincide between the devices. The hub device 280 and/or the network device 290 may determine that the power removal event is a system power removal event when the queried light bulbs 212, 222 also experienced the power removal event and send the prior power state to the light bulbs 212, 222. The hub device 280 and/or the network device 290 may send to and/or query the light bulbs 212, 222 periodically, at a time of day, and/or aperiodically (e.g., based on a user action).

The light bulbs 212, 222 may transmit a digital message to the hub device 280 that indicates the occurrence of a power removal event without being requested. The digital messages sent from the light bulbs 212, 222 may indicate the power states of the light bulbs 212, 222. The digital messages may indicate whether a power removal event has occurred to one or more other lighting devices. The digital message may identify the lighting devices by a name, a number (e.g., unique identifier), etc. The light bulbs 212, 222 may send to and/or query the hub device 280 and/or the network device 290 periodically, at a time of day, and/or aperiodically (e.g., based on a user action).

The light bulbs 212, 222 may query for a prior power state after detection of a power removal event. For example, the hub device 280 and/or the network device 290 may send a digital message to the light bulb 212 in response to a request for a prior power state by the light bulbs 212, 222 after the occurrence of a power removal event. The light bulbs 212, 222 may send a digital message that indicates that a power removal event occurred, which may be interpreted by the hub device 280 and/or the network device 290 as a request for a prior power state. The digital message may include a time or timeframe associated with the power removal event. If the hub device 280 and/or the network device 290 did not experience the power removal event (e.g., within a coinciding time period), the hub device 280 and/or the network device 290 may prevent the sending of the prior power state.

The light bulbs 212, 222 may send a message to the other devices in the system 200. For example, the light bulb 212 may send a message to the other devices that the light bulb 212 experienced a power removal event, which may indicate that the light bulb 212 has regained power after the power removal event, and the other devices in the system 200 (e.g., the hub device 280, the network device 290 and/or one or more other lighting devices) may send a digital message indicating a power state at which the light bulb 212 should operate.

Though the messages indicating power states and/or identification of power removal events may be described herein as being performed by the hub device 280 and/or the network device 290, such functionality may be implemented at the remote control device 250, and/or at the control devices (e.g., lighting devices) themselves. For example, one or more lighting devices, such as the light bulb 212, the light bulb 222, etc., may be used to store the prior power states, identify the occurrence of a power removal event (e.g., locally and/or by querying other devices), and/or communicate the prior power states to one or more other lighting devices in response to a system power removal event. The digital messages indicating the power states and/or querying for acknowledgement of a power removal event may be received by lighting devices neighboring the lighting devices sending the messages and/or within a similar location as the lighting devices sending the messages. The lighting devices receiving the messages may set their power state to the power state included in the digital messages, or respond to the requests for acknowledgement of a power removal event when such a power removal event has occurred locally.

The lighting devices and/or the hub device 280 may be configured according to one or more locations (e.g., rooms). The lighting devices and/or the hub device 280 may be configured according to one or more sources of power (e.g., AC power source 202). The lighting devices and/or the hub device 280 may be configured according to one or more AC circuits. A lighting devices and/or the hub 280 may be identified by a corresponding location, AC power source, and/or AC circuit. The location, AC power source, and/or AC circuit corresponding to a lighting device and/or the hub device 280 may be stored by the lighting devices and/or the hub device 280.

The lighting devices and/or the hub device 280 may receive power from one or more AC circuits. For example, the light bulb 212 may receive power from AC power source 202. The light bulb 212 may receive power from AC power source 202 via an AC circuit. The toggle actuator 216 may be actuated so that power is provided to the light bulb 212 or so that power is not provided to the light bulb 212. The light bulb 222 and the hub device 280 may receive power from AC power source 202. The light bulb 212 may receive power from AC power source 202 via an AC circuit that is different than the AC circuit providing power to light bulb 212. For example, the light bulb 222 may receive power from the electrical receptacle 226 and/or the hub device 280 may receive power from electrical receptacle 229. The electrical receptacles 226, 229 may not be controlled by the actuation of a switch (e.g., toggle actuator 216). The lighting devices and/or the hub device 280 may identify light bulb 212 as being controllable by a switch (e.g., toggle actuator 216). The lighting devices and/or the hub device 280 may identify light bulb 222 as not being controllable by a switch (e.g., toggle actuator 216).

The lighting devices and/or the hub device 280 may determine whether power is provided to one or more lighting devices and/or hub devices. The lighting devices and/or the hub device 280 may determine whether power is provided to one or more lighting devices and/or hub devices according to the AC circuits from which the lighting devices and/or the hub device 280 receive electrical power. For example, the lighting devices and/or the hub device 280 may determine if electrical power is provided to the light bulb 212. The lighting devices and/or the hub device 280 may also, or alternatively, determine if electrical power is provided to the light bulb 222 and/or the hub device 280. The lighting devices and/or the hub device 280 may determine the type of power removal event (e.g., local power removal event, system power removal event) by determining if one or more AC circuits have been affected by a power removal event. For example, the hub device 280 may determine that a power removal event is a system power removal event (e.g., a brownout and/or a blackout) by determining that multiple AC circuits (e.g., AC circuits providing electrical power to the light bulb 212, the light bulb 222, and/or the hub device 280) have experienced a power removal event. The lighting devices and/or the hub device 280 may query devices (e.g., lighting devices, the hub device 280, and/or other control devices) connected to different AC circuits to determine if the power removal event is a system power removal event (e.g., a power removal event affecting more than one AC circuit, such as a brownout or blackout) and/or whether the power removal event is a local power removal event (e.g., a power removal event affecting a single AC circuit), such as when a user physically turns off the toggle actuator 216 that controls the light bulb 212. The lighting devices and/or the hub device 280 may query devices positioned within different locations (e.g., rooms) to determine if a power removal event is a system power removal event or a local power removal event.

Setting the power state of the lighting devices to the respective prior power states may be controlled by the user. For example, a user may set the power state of the light bulb 212 to fifteen percent (e.g., when the user is away on vacation). If a system power removal event begins and ends, the user may apply a setting that is stored at the hub device 280 and/or the lighting device 212 to automatically control the light bulb 212 to an intensity level of fifteen percent when power is again provided to the light bulb 212 (e.g., when the power removal event ends). As another example, a user may set the intensity level of the light bulb 212 to zero percent (e.g., prior to the user being away or going to bed). If a system power removal event occurs while the user is away or is in bed, the intensity level that was previously set by the user may be used to control the light bulb 212 to an intensity of zero percent when power is again provided to the light bulb 212 (e.g., when the power removal event ends). The user settings may be stored and applied similar to the prior power state that is stored and applied herein. User settings may be given priority over a prior power state that has been stored after the user settings, or the prior power state may be given priority over the user settings. Although the control devices (e.g., lighting devices) may be configured to provide light at an intensity displayed prior to a system power removal event, this may be disabled by the user. For example, a user may configure the control devices so that they provide light at a default intensity level (e.g., 100% intensity level, 85% intensity level, etc.) upon a system power removal event ending.

The hub device 280 and/or the lighting devices may determine whether a power removal event is a local power removal event or a system power removal event using one or more factors. For example, the hub device 280 and/or the lighting devices may determine that a power removal event is a local power removal event or a system power removal event based on the number of control devices (e.g., lighting devices) that have experienced a power removal event. The hub device 280 and/or the lighting devices may set a threshold for the number of devices that experienced the power removal event indicating that the power removal event was a system power removal event. If each of the lighting devices within a load control system have experienced a power removal event, it may be determined that the power removal event was a system power removal event. If one or more lighting devices within a load control system have not experienced a power removal event at the same time, power removal events experienced by the control devices may be determined to be local power removal events.

The hub device 280 and/or the lighting devices may determine that a power removal event is a local power removal event or a system power removal event based on the type of the control devices that have experienced a power removal event. Some control devices may not be downstream of a switch (e.g., the wall-mounted load control device 210). For example, a dimmer device may not be downstream of a switch and may be configured to control the power delivered to a lighting device, such as a dimmable light source. Other devices may be downstream of a switch. The light bulb 212, shown in FIG. 2A, may be an example of a device that is downstream of a switch.

A weighting factor may be used for determining whether a power removal event is a local power removal event or a system power removal event. For example, control devices (e.g., lighting devices) not downstream of a switch may be provided a higher weight than control devices downstream of a switch, when determining whether a power removal event was a local power removal event or a system power removal event. For example, a dimmer device (such as dimmer device 218, shown in FIG. 2B) experiencing a power removal event may be provide a larger weight than the light bulb 212 experiencing a power removal event, when determining whether a power removal event was a local power removal event or a system power removal event. If the light bulb 212 experiences a power removal event and the dimmer device continues receiving power at the time of the power removal event at the bulb 212, it may be determined that the power removal event experienced by the light bulb 212 is a local power removal event. If dimmer device experiences a power removal event, the hub device 280 and/or the lighting devices may determine that the power removal event experienced by the dimmer device is a system power removal event.

The light bulb 212, the light bulb 222, and the hub device 280 may be electrically coupled to AC power source 202. Although the light bulb 212, the light bulb 222, and the hub device 280 are electrically coupled to the same power source (e.g., AC power source 202), the light bulb 212 is on a different circuit than the light bulb 222 and the hub device 280. The light bulb 212 is electrically coupled to the wall-mounted load control device 210. The light bulb 222 and the hub device 280 are not electrically coupled to the wall-mounted load control device 210. The hub device 280 and/or lighting devices may query more than one control device (e.g., the light bulb 212 and the light bulb 222) to determine if a power removal event is a system power removal event or a local power removal event. The hub device 280 and/or lighting devices may query the hub device 280 and one or more control devices to determine if a power removal event is a system power removal event or a local power removal event. For example, the hub device 280 may query the light bulb 212 and the light bulb 222 to determine if a power removal event is a system power removal event or a local power removal event. If the light bulb 212 experienced a power removal event and the light bulb 222 experienced a power removal event, the hub device 280 may determine that the power removal events are system power removal events (e.g., because more than one control device on more than one AC circuit experienced a power removal event). If the light bulb 212 experienced a power removal event, the light bulb 222 experienced a power removal event, and the hub device 280 experienced a power removal event, it may further be determined that the power removal events are system power removal events. If the light bulb 212 experienced a power removal event and the light bulb 222 did not experience a power removal event, the hub device 280 may determine that the power removal event to the light bulb 212 was a local power removal event (e.g., the light bulb 212 experienced a power removal event when a user turned the toggle actuator 216 to the off position).

The hub device 280 may query control devices and/or hub devices in one or more locations (e.g., rooms) to determine if a power removal event was a system power removal event or a local power removal event. For example, if power removal events occurred within more than one room, the hub device 280 may determine that the power removal event was a system power removal event. The hub device 280 may query, on a periodic basis (e.g., every 10 seconds, 5 minutes, 1 hour, etc.) whether the control devices have experienced a power removal event. The hub device 280 may query, aperiodically (e.g., based on a user actuation at the hub device 280), whether the control devices have experienced a power removal event. Also, or alternatively, the hub device 280 may query control devices to determine if the control devices have experienced a power removal upon the hub device 280 regaining power after experiencing a power removal event.

The control devices (e.g., lighting devices, such as the light bulb 212) may query control devices (e.g., other lighting devices, such as the light bulb 222) to determine whether the control devices have experienced a power removal event. The light bulb 212 may determine whether the light bulb 212 has experienced a power event. The light bulb 212 may determine whether the power removal event of the other control device (e.g., the light bulb 222) and/or the power removal event of the light bulb 212 was a system power removal event or a local power removal event. For example, the light bulb 212 may query the light bulb 222 to determine whether the light bulb 222 has experienced a power removal event. The light bulb 212 may query the light bulb 222 and/or access local storage to determine if the light bulb 222 and/or the light bulb 212 has experienced a power removal event.

The hub device 280 and/or control devices (e.g., lighting devices) may perform a query to determine whether a power removal event occurred, and/or the type of the power removal event, based on one or more conditions. For example, the lighting devices (e.g., the light bulb 212) may perform a query to determine whether a power removal event occurred, and/or the type of the power removal event, after the light bulb 212 loses and regains power. The light bulb 212 may query other lighting devices after regaining power and/or the light bulb 212 may query the hub device 280 after regaining power. After regaining power, the light bulb 212 may query other lighting devices and/or the hub device 280 to determine whether the other lighting devices and/or the hub device 280 have experienced, and/or are experiencing, a power removal event.

If the other lighting devices and/or the hub device 280 have experienced, and/or are experiencing, a power removal event, the light bulb 212 may determine whether the power removal event experienced by the other control devices and/or the hub device 280 occurred at the same time that the light bulb 212 lost power. The light bulb 212 may perform this determination by requesting the time of the power removal events, the duration of the power removal events, etc. For example, if the other control devices and/or the hub device 280 experienced a power removal event at the same time, and/or for the same duration that the light bulb 212 experienced the power removal event, the power removal event may be determined to be a system power removal event. If the other control devices and/or the hub device 280 did not experience a power removal event, and/or if the other control devices and/or the hub device 280 did not experience a power removal event at the same time as the light bulb 212, the power removal event may be determined to be a local power removal event.

The hub device 280 may perform a query to determine whether a power removal event occurred, and/or the type of the power removal event, after the hub device 280 loses and regains power. The hub device 280 may query lighting devices after regaining power. The hub device 280 may query other hub devices after regaining power. After regaining power, the hub device 280 may query other hub devices and/or lighting devices to determine whether the other hub devices and/or lighting devices have experienced, and/or are experiencing, a power removal event.

If the other hub devices and/or the lighting devices have experienced, and/or are experiencing, a power removal event, the hub device 280 may determine whether the power removal event experienced by the other hub devices and/or the lighting devices occurred at the same time that the hub device 280 lost power. The hub device 280 may perform this determination by requesting the time of the power removal events, the duration of the power removal events, etc. For example, if the other hub devices and/or the lighting devices experienced a power removal event at the same time, and/or for the same duration, that the hub device 280 experienced the power removal event, the power removal event may be determined to be a system power removal event. If the other hub devices and/or the lighting devices did not experience a power removal event, and/or if the other hub devices and/or the lighting devices did not experience a power removal event at the same time as the hub device 280, the power removal event may be determined to be a local power removal event.

The hub device 280 and/or the lighting devices may perform a query to determine whether a power removal event occurred, and/or the type of the power removal event, periodically. For example, the hub device 280 and/or the lighting devices may perform a query to determine whether a power removal event occurred, and/or the type of the power removal event at intervals of five minutes, thirty minutes, two hours, etc. The hub device 280 and/or the lighting devices may perform a query to determine whether a power removal event occurred, and/or the type of the power removal event, aperiodically. For example, the hub device 280 and/or the lighting devices may perform a query to determine whether a power removal event occurred, and/or the type of the power removal event, based on a user action and/or based on a time of day. The hub device 280 and/or the lighting devices may perform a query to determine whether a power removal event occurred, and/or the type of the power removal event, based on one or more of the factors, or a combination of the factors, described herein.

The hub device 280 and/or the lighting devices may perform a query to determine whether a power removal event occurred, and/or the type of the power removal event, based on receiving a message from one or more other devices. For example, another control device may send the hub device 280 and/or lighting devices a message. The message may request that the hub device 280 and/or the lighting devices query other control devices and/or hub devices to determine whether a power removal event occurred, and/or the type of the power removal event that may have occurred. The other control devices may send this message to the hub device 280 and/or the lighting devices for one or more reasons. For example, the other control devices may send this message to the hub device 280 and/or the lighting devices after the control devices regain power (e.g., the other control devices regain power after a power removal event). The other control devices may send this message to the hub device 280 and/or the lighting devices, e.g., periodically or aperiodically.

As described above, the light bulb 212, the light bulb 222, and the hub device 280 are coupled to AC power source 202. Although the light bulb 212, the light bulb 222, and the hub device 280 are coupled to the same power source (e.g., AC power source 202), the light bulb 212 is on a different circuit than the light bulb 222 and the hub device 280. The light bulb 212 is coupled to the wall-mounted load control device 210. The light bulb 222 and the hub device 280 are not coupled to the wall-mounted load control device 210. The light bulb 212 may query one or more control devices to determine if a power removal event is a system power removal event or a local power removal event. The light bulb 212 may query the hub device 280 and one or more control devices to determine if a power removal event is a system power removal event or a local power removal event. For example, the light bulb 212 may query the light bulb 222 to determine if a detected power removal event is a system power removal event or a local power removal event. If the light bulb 222 also experienced a power removal event, the light bulb 212 may determine that the power removal events are system power removal events (e.g., because more than one control device on more than one AC circuit experienced a power removal event). If the light bulb 212 experienced a power removal event, the light bulb 222 experienced a power removal event, and the hub device 280 experienced a power removal event, it may further be determined that the power removal events are system power removal events. If the light bulb 212 experienced a power removal event and the light bulb 222 did not experience a power removal event, the light bulb 212 may determine that the power removal event to the light bulb 212 was a local power removal event (e.g., the light bulb 212 experienced a power removal event when a user turned the toggle actuator 216 to the off position).

The light bulb 212 may query other lighting devices and/or the hub devices in one or more locations (e.g., rooms) to determine if a power removal event was a system power removal event or a local power removal event. For example, if power removal events occurred within more than one room, the light bulb 212 may determine that the power removal event was a system power removal event. The light bulb 212 may query, on a periodic basis (e.g., every 10 seconds, 5 minutes, 1 hour, etc.) whether other lighting devices and/or the hub devices have experienced a power removal event. The light bulb 212 may query, aperiodically (e.g., based on a user action), whether the other lighting devices and/or the hub devices have experienced a power removal event. Also, or alternatively, the light bulb 212 may query the other lighting devices and/or the hub devices to determine if the other lighting devices and/or the hub devices have experienced a power removal upon the light bulb 212 regaining power after experiencing a power removal event.

The hub device 280 may comprise an additional source of power (e.g., an internal or external battery). The battery may provide power to the hub device 280 in the event that electrical power from an AC power source (such as AC power source 202, shown in FIG. 2) ceases to provide power. For example, the hub device 280 may receive electrical power from a battery if the hub device 280 experiences a power removal event (e.g., a system power removal event and/or a local power removal event). The hub device 280 may be configured to determine that it is not receiving power from the AC power source, but is being powered from the battery. If the hub device 280 experiences a power removal event and the hub device 280 begins receiving power from the battery, the hub device 280 may query control devices (e.g., lighting devices, such as the light bulb 212 and the light bulb 222) to determine if the power removal event to the hub device was a system power removal event or a local power removal event.

For example, after the hub device 280 experiences a power removal event and receives power from a battery, the hub device 280 may query the light bulb 212 to determine if light bulb 212 has experienced a power removal event. The hub device 280 may query the light bulb 212 to determine whether the light bulb experienced a power removal event at the same time as the hub device 280. If the light bulb 212 experienced a power removal event, and/or if the light bulb 212 experienced the power removal event at the same time as the hub device, the hub device 280 may determine that the power removal event was a system power removal event. If the light bulb 212 did not experience a power removal event, and/or if the light bulb 212 experienced a power removal event at a different time than the hub device 280, the hub device 280 may determine that the power removal event of the hub device was a local power removal event. The hub device may query one or more other control devices (e.g., the light bulb 222) to determine if the power removal event experienced by the hub device was a system power removal event or a local power removal event.

Figure 2B:
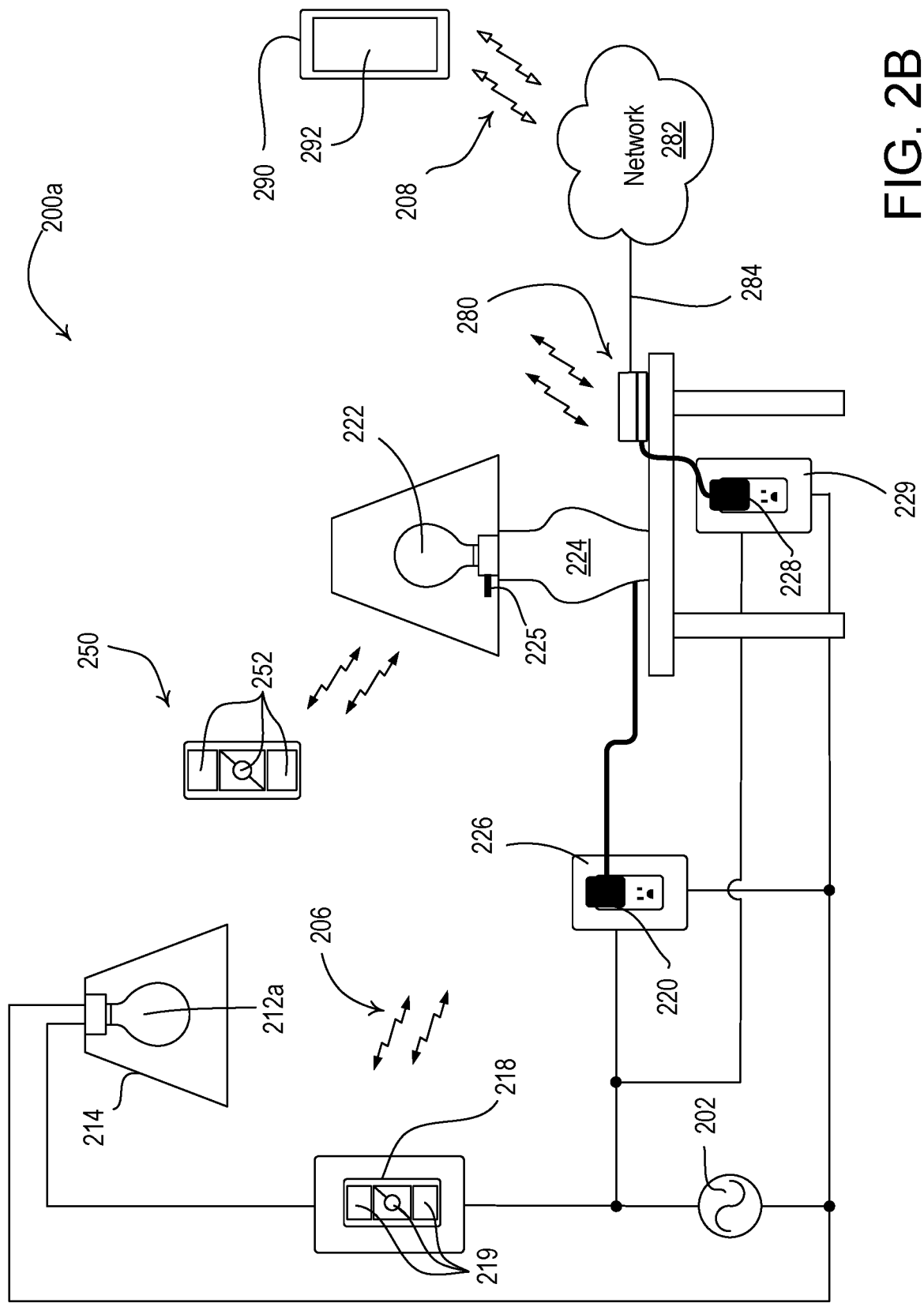

FIG. 2B shows a load control system 200a having a wall-mounted load control device (e.g., a dimmer device 218) for controlling the amount of power delivered to a lighting device, such as a light bulb 212a (e.g., a lighting load). As shown in FIG. 2B, the light bulb 212a may comprise a standard, dimmable light bulb (e.g., a light bulb that is not responsive to wireless signals). The dimmer device 218 may be configured to control the amount of power delivered to the light bulb 212a using a phase-control dimming technique. The dimmer device 218 may include actuators, such as buttons 219. The dimmer device 218 may be configured to control the power delivered to the light bulb 212a in response to actuation of buttons 219. The dimmer device 218 may be configured to receive digital messages via wireless signals, e.g., radio-frequency (RF) signals 206 (e.g., ZIGBEE®; NFC; BLUETOOTH®; WI-FI®; or a proprietary communication channel, such as CLEAR CONNECT™, etc.). Examples of wall-mounted dimmer devices are described in greater detail in U.S. Pat. No. 5,248,919, issued Sep. 28, 1993, entitled LIGHTING CONTROL DEVICE, and U.S. Pat. No. 9,679,969, issued Jun. 13, 2017, entitled WIRELESS LOAD CONTROL DEVICE, the entire disclosures of which are hereby incorporated by reference.

The dimmer device 218 may be configured to control the power delivered from the AC power source 202 to the light bulb 212a to control the intensity level of the light bulb 212a. The dimmer device 218 may retain the power state of the light bulb 212a. The dimmer device 218 may be configured to retain the power state of the light bulb 212a to an on power state. For example, dimmer device 218 may be configured to retain an intensity level of the light bulb 212a to a non-zero value (e.g., an intensity level of 1%-100%). The dimmer device 218 may retain the power state of the light bulb 212a to an on power state, for example, by physically maintaining electrical continuity of the circuit (e.g., AC circuit) between AC power source 202 and the light bulb 212a. The dimmer device 218 may receive the power from the AC power source 202 and prevent the power from being sent to the light bulb 212a to turn the light bulb 212a to the off power state. The dimmer device 218 may, however, store a time at which the power is received 202 and/or lost from the AC power source 202. The dimmer device 218 may identify when a power outage is a system power outage, as the dimmer device 218 may receive power so long as the AC power source 202 is providing power. Because the dimmer device 218 may receive power so long as the AC power source 202 is providing power (e.g., the dimmer device 218 is not downstream of a switch, such as wall-mounted load control device 210), the dimmer device 218 may be considered to be an unswitched electrical device. The load control system 200a may also comprise the light bulb 212, as shown in FIG. 2A, that receives power from the AC power source 202 via the wall-mounted load control device 210 and is responsive to the RF signals 206.

Referring again to FIG. 2B, as the dimmer device 218 may receive power from the AC power source 202 so long as the AC power source 202 is providing power, the light bulbs 212a, 222 and/or the hub device 280 may query the dimmer device 218 to determine whether a power removal event was a local power removal event or a system power removal event. Because the dimmer device 218 may receive power from the AC power source 202 so long as the AC power source 202 is providing power, it may be more reliable for light bulbs 212a, 222 and/or the hub device 280 to query the dimmer device 218 to determine the type of power removal event than querying other devices (e.g., light bulbs 212a, 222 and/or hub device 280), which may be unplugged from the power source and/or turned off by a light switch. The dimmer device 218 may be an indicator that the power removal event was a system power removal event. If there are multiple dimmer devices in the load control system 200, each of the dimmer devices losing power may indicate a system power removal event, while some or none of the dimmer devices losing power may indicate a local power removal event. The indication of the dimmer devices losing power may be used in combination to with other devices (e.g., the light bulbs 212a, 222, the hub device 280, etc.) to determine whether a power removal event was a local power removal event or a system power removal event.

The dimmer device 218 may not experience a local power removal event. For example, because the dimmer device 218 does not receive power from the AC power source 202 through a switch (e.g., the wall-mounted load control device 210), the dimmer device 218 may not be turned off by a user. A dimmer device 218 may experience a system power removal event. For example, a dimmer device 218 may experience a blackout. Because the dimmer device 218 may not experience a local power removal event, a power removal event experienced by the dimmer device 218 may be determined to be a system power removal event. The hub device 280 and/or lighting devices (e.g., the light bulb 212a and the light bulb 222) may determine that the power removal event experienced by the dimmer device 218 is a system power removal event.

As another example, the light bulb 222 may experience a power removal event. The light bulb 222 receives electrical power from electrical receptacle 226, which is not coupled to dimmer device 218. Because the light bulb 222 is not coupled to dimmer device 218, the power removal event to the light bulb 222 may be determined to be a local power removal event (e.g., in response to an actuation of the actuator 225 of the table lamp 224) and/or the power removal event to the light bulb 222 may be determined to be a system power removal event. To determine whether a power removal event is a local power removal event or a system power removal event, the power states of one or more lighting devices, dimmer devices, and/or hub devices may be determined. For example, if the light bulb 222 is experiencing a power removal event and the dimmer device 218 is experiencing a power removal event, it may be determined that the power removal event is a system power removal event. If the light bulb 222 is experiencing a power removal event and the dimmer devices positioned within one or more rooms are experiencing a power removal event, it may be determined that the power removal event is a system power removal event. If the light bulb 222 is experiencing a power removal event and the dimmer device 218 is not experiencing a power removal event, and vice-versa, it may be determined that the power removal event is a local power removal event. The lighting devices and/or the hub device 280 may determine the power states of one or more lighting devices.

After the lighting devices and/or other devices (e.g., the hub device 280) determine that the power removal event is a system power removal event, the power states of the lighting devices may be adjusted upon the power removal event ending. For example, upon the power removal event ending, the lighting devices and/or other the hub device 280 may adjust the power state of the lighting devices to prior power states of the lighting devices (e.g., power states prior to the power removal event). For example, after the lighting devices and/or the hub device 280 determine that the power removal event is a system power removal event, the lighting devices and/or the hub device 280 may obtain the prior power states of the lighting devices (e.g., via memory of the lighting devices, memory of the hub device 280, memory of the network device 290, memory of an external server, etc.). The lighting devices and/or the hub device 280 may send and/or set the power states of the lighting devices to the obtained prior power states of the lighting devices.

Figure 2C:
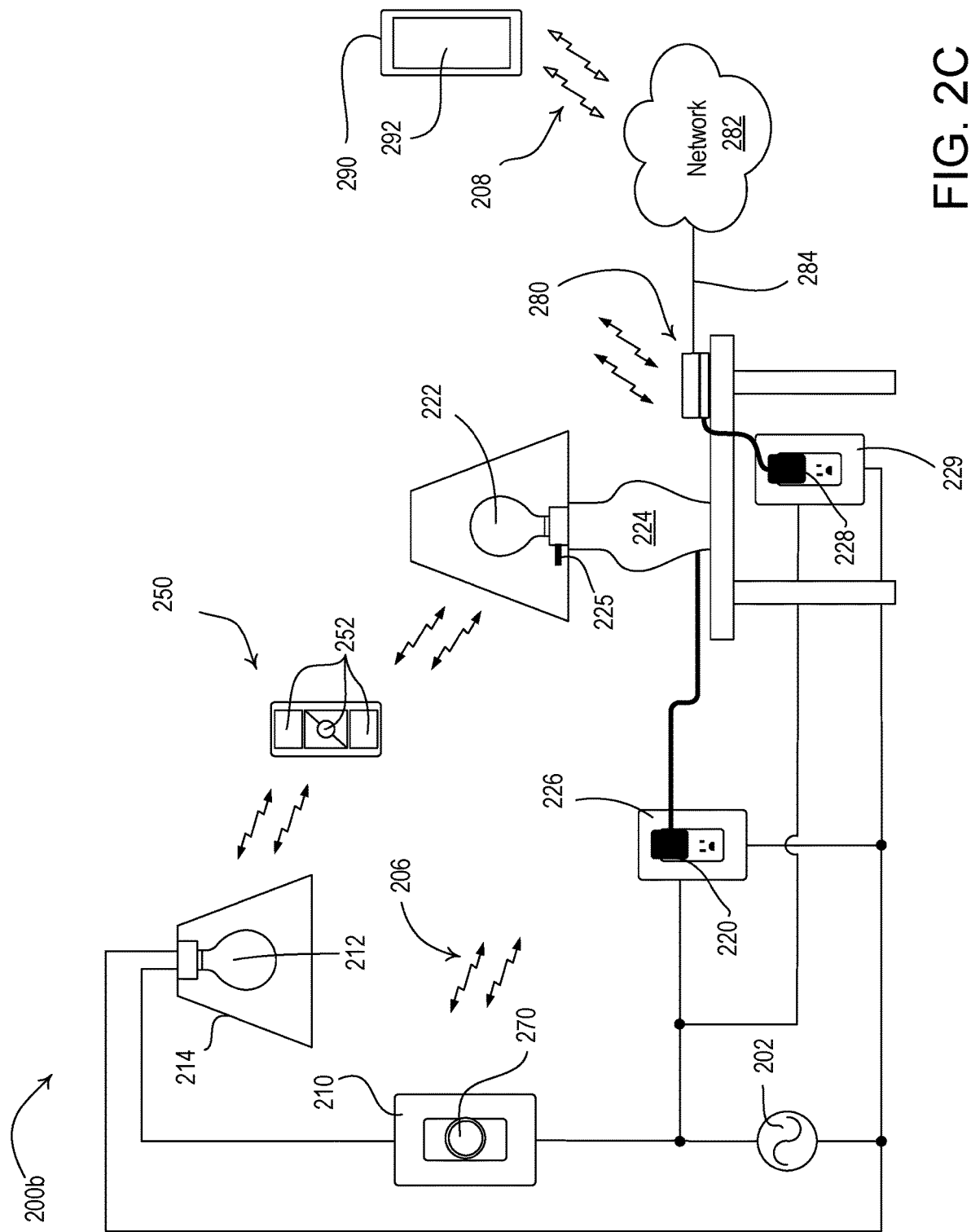

FIG. 2C shows a load control system 200b having a remote control device 270 that may be mounted over a toggle actuator 216 of the wall-mounted load control device 210 (e.g., such as the toggle actuator 216 shown in FIG. 2A). The lighting devices (e.g., light bulbs 212, 222) may be turned on or off, or adjust the intensity level, in response to digital messages transmitted by the remote control device 270 via the RF signals 206. For example, the light bulbs 212, 222 may be turned on or off by turning the remote control device 270, or pressing the remote control device 270. The intensity level of the light bulbs 212, 222 may be increased or decreased by rotating the remote control device 270 in one direction or another, respectively.

The remote control device 270 may be a retrofit remote control device capable of being mounted over the toggle actuator 216 of the wall-mounted load control device 210. The remote control device 270 may be coupled to the toggle actuator 216 to retain a power state of the lighting devices controlled by the wall-mounted load control device 210. For example, the remote control device 270 may be configured to maintain the switch installed on the wall-mounted load control device 210 in the "on" position (e.g., by covering the switch when in the "on" position) to maintain the flow of power from the AC power source 202 to the lighting bulb 212. Because the remote control device 270 may be configured to maintain the switch installed on the wall-mounted load control device 210 in the "on" position (e.g., the light bulb 212 is not downstream of a switch that is able to be controlled to an "off" position), the light bulb 212 downstream of the wall-mounted load control device 210 with the remote control device 270 mounted thereto may be considered to be an unswitched electrical device. The remote control device 270 may be configured to attach to the toggle actuator 216 and hold toggle actuator 216 in the "on" position. Because toggle actuator 216 is maintained in an "on" position, the light bulb 212 may be held in an on power state.

The remote control device 270 may communicate with other devices (e.g., light bulbs 212, 222, the network device 290, and/or the hub device 280) to transition the power states of light bulbs 212, 222. For example, the remote control device 270 may communicate digital messages via the RF signals 206 with light bulbs 212, 222 and/or the hub device 280 to transition the power states of light bulbs 212, 222. The remote control device 270 may transmit digital messages including a move-to-level command that identifies a lighting level to which the lighting devices may change. The move-to-level command may indicate an "on" event or an "off" event to turn the light bulbs 212, 222 on or off, respectively. For example, the "on" event may be indicated with a 100% lighting level, or another defined lighting level. The "off" event may be indicated with a 0% dimming level. The lighting level for the "on" event and/or the "off" event may also, or alternatively, be stored at the light bulbs 212, 222 and the light bulbs 212, 222 may change to the lighting level upon receiving an indication of the occurrence of the "on" event or "off" event from the remote control device 270. The digital messages may indicate an "on" event when the remote control device 270 is rotated a predefined distance in one direction. The digital messages may indicate an "off" event when the remote control device 270 is rotated a predefined distance in the opposite direction. The digital messages may indicate an "on" event or an "off" event when the remote control device 270 is pressed (e.g., when a button on the face of the remote control device is pressed or the remote control device 270 is pressed in).

The remote control device 270 may transmit digital messages configured to increase the lighting level of the light bulbs 212, 222 when the remote control device 270 is rotated in one direction. The remote control device 270 may transmit digital messages configured to decrease the lighting level of the light bulbs 212, 222 when the remote control device 270 is rotated in the opposite direction. The digital messages may include a move-with-rate command, which may cause the light bulbs 212, 222 to change their respective intensity level by a predefined amount. The move-with-rate command may cause the light bulbs 212, 222 to retain their proportional intensity levels, and/or difference in respective intensity levels. The remote control device 270 may send digital messages to increase or decrease the lighting level by a predefined amount when rotated a predefined distance. The amount of the increase or decrease may be indicated in the digital messages or may be predefined at the light bulbs 212, 222.

The lighting devices (e.g., the light bulbs 212, 222) and/or the hub device 280 may be associated with the remote control device 270. The unique identifier (e.g., the serial number) of the remote control device 270 may be stored at the associated devices for recognizing digital messages therefrom for operating according to instructions in the digital messages.

A lighting device associated with a remote control device that is configured to be mounted overtop of a light switch (e.g., the remote control device 270 that is mounted over the toggle actuator 216 of the wall-mounted load control device 210) may be assumed to be incapable of experiencing a local power removal event. For example, the light bulb 212 may be associated with the remote control device 270 for performing load control. The lighting bulb 212 may be assumed to be incapable of experiencing a local power removal event since the remote control device 270 retains the power state of the light bulb 212 in an on power state. Even when the remote control device 270 is actuated to change the light bulb 212 to the off power state, power may still be provided from the AC power source 202 to the light bulb 212 through the wall-mounted load control device 210, which is maintained in the on position.

The light bulb 212 that is receiving power from the AC power source 202 through the wall-mounted load control device 210 having the remote control device 270 may experience a system power removal event. For example, the light bulb 212 may experience a blackout. As the remote control device 270 may prevent the light bulb 212 from experiencing a local power removal event, a power removal event experienced by the light bulb 212 coupled to the remote control device 270 may be determined to be a system power removal event. The light bulb 212 may determine that the power removal event experienced by the light bulb 212 is a system power removal event since the light bulb 212 is associated with the remote control device 270. The hub device 280 may store the association of the light bulb 212 with the remote control device 270 and may determine that the power removal event experienced by the light bulb 212 is a system power removal event since the light bulb 212 is associated with the remote control device 270. The light bulb 212 and/or the hub device 280 may control the state of the light bulb 212 based on the determination.

Before being associated with a remote control device (e.g., the battery-powered remote control device 250 and/or the remote control device 270), the light bulb 212 may be configured to operate in an operation mode. The operation mode may be a switched mode (e.g., have stored in memory that the light bulb 212 should operate in the switched mode). When operating in the switched mode, the light bulb 212 may assume that each power removal event is a local power removal event and rely on the hub device 280 and/or other lighting devices to determine if the power removal event was a system power removal event. If the light bulb 212 is associated with the battery-powered remote control device 250 (e.g., that is not configured to be mounted over the toggle actuator 216 of the wall-mounted load control device 210), the light bulb 212 may be configured to continue operating in the switched mode. If the light bulb 212 is associated with at least one remote control device that is configured to be mounted over the toggle actuator 216 of the wall-mounted load control device 210 (e.g., the remote control device 270), the light bulb 212 may be configured to assume that the light bulb 212 is coupled downstream of a switch that is not able to be controlled to the off position. The unique identifier and/or a device type identifier of the battery-powered remote control device 250 and/or the remote control device 270 may be stored in memory to indicate the operation mode. The operation mode may be explicitly indicated in memory based on the association with the battery-powered remote control device 250 and/or the remote control device 270. The light bulb 212 may store in memory that the light bulb 212 should operate in another operation mode, such as an unswitched mode, during which the light bulb 212 may assume that each power removal event is a system power removal event.

The light bulb 222 may experience a power removal event. The light bulb 222 may receive electrical power from the electrical receptacle 226 and/or the light bulb 222 may be controlled by another switch or from an AC power source other than the light bulb 212. The light bulb 222 may be unassociated with the remote control device 270. As the light bulb 222 is unassociated with remote control device 270, the power removal event to the light bulb 222 may be determined to be a local power removal event (e.g., in response to an actuation of the actuator 225 of the table lamp 224) or a system power removal event. To determine whether a power removal event is a local power removal event or a system power removal event, the power states of one or more lighting devices and/or the hub device 280 may be determined. For example, if the light bulb 222 is experiencing a power removal event and light bulb 212 is experiencing a power removal event, it may be determined that the power removal event is a system power removal event. The light bulb 222 may receive an indication from the light bulb 212 that the light bulb 212 is in an unswitched mode or associated with the remote control device 280 and use this indication to determine that the power removal event that was also experienced by the light bulb 212 was a system power removal event. If the light bulb 222 is experiencing a power removal event and lighting devices positioned within other rooms are experiencing a power removal event, it may be determined that the power removal event is a system power removal event. If the light bulb 222 is experiencing a power removal event and light bulb 212 is not experiencing a power removal event, it may be determined that the power removal event is a local power removal event.

Upon the lighting devices and/or the hub device 280 determining that the power removal event is a system power removal event, the power state of the lighting devices may be adjusted after the power removal event has ended. For example, after the power removal event has ended, the lighting devices and/or the hub device 280 may adjust the power state of the lighting devices to the prior power states of the lighting devices. For example, upon the lighting devices and/or the hub device 280 determining that the power removal event is a system power removal event, the lighting devices and/or the hub device 280 may obtain the prior power states of the lighting devices (e.g., via the memory of the lighting devices, the memory of the hub device 280, the memory of the network device 290, memory of an external server, etc.). The lighting devices and/or the hub device 280 may send and/or set the power states of the lighting devices to the obtained prior power states of the lighting devices.

Figure 2D:
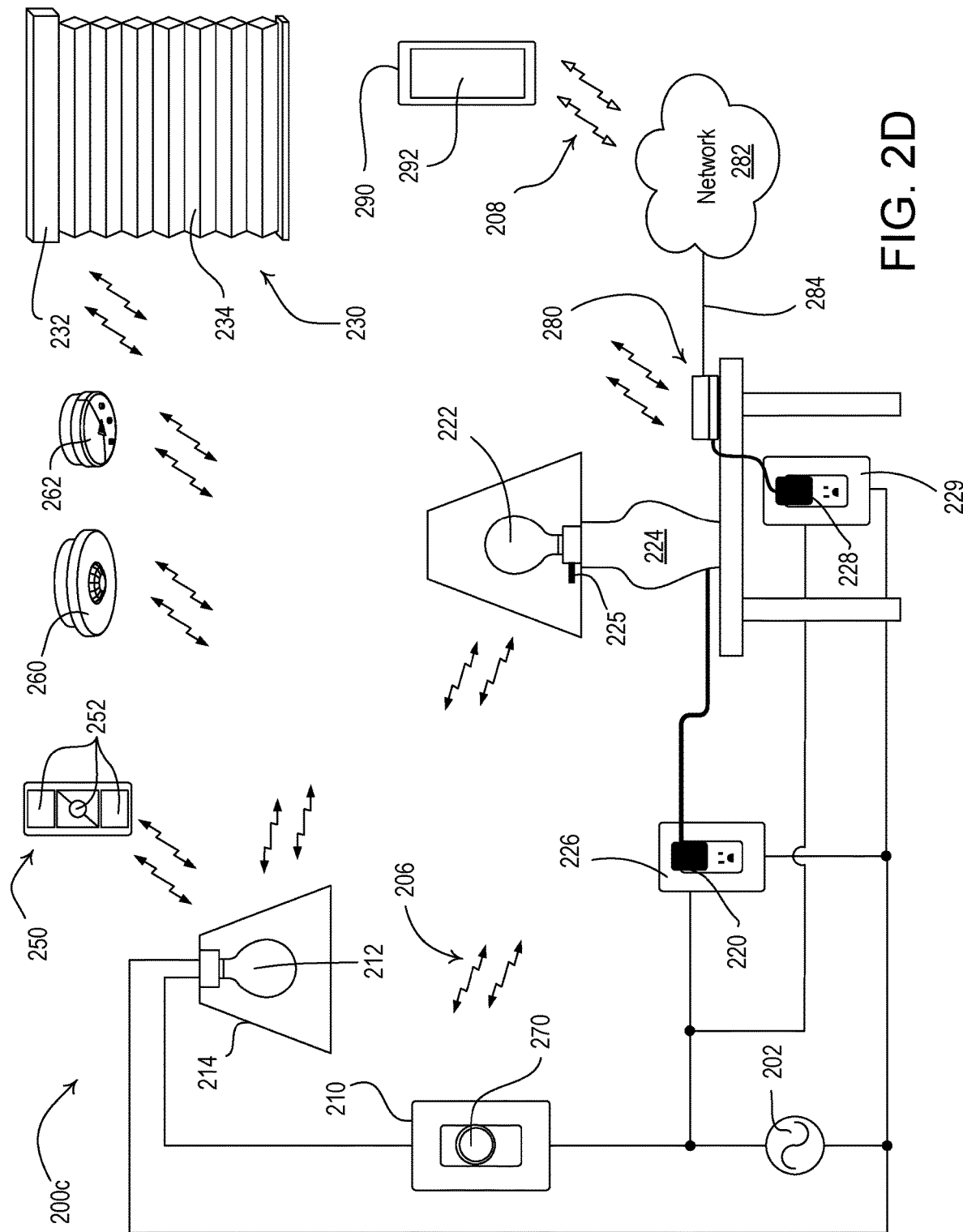

FIG. 2D shows a load control system 200c including additional control devices (e.g., input devices, load control devices, and/or controller devices). The load control system 200c may include other load control devices, which may operate similar to other load control devices described herein. Examples of other load control devices may include a daylight control device, e.g., a motorized window treatment 230, mounted in front of a window for controlling the amount of daylight entering the space in which the load control system 200c is installed. The motorized window treatment 230 may include, for example, a cellular shade, a roller shade, a drapery, a Roman shade, a Venetian blind, a Persian blind, a pleated blind, a tensioned roller shade systems, or other suitable motorized window covering. The motorized window treatment 230 may include a motor drive unit 232 for adjusting the position of a covering material 234 of the motorized window treatment in order to control the amount of daylight entering the space. The motor drive unit 232 of the motorized window treatment 230 may have an RF receiver and an antenna mounted on or extending from a motor drive unit of the motorized window treatment. The motor drive unit 232 of the motorized window treatment 230 may be battery-powered or may receive power from an external direct-current (DC) power supply. Examples of battery-powered motorized window treatments are described in greater detail in commonly-assigned U.S. Pat. No. 8,950,461, issued Feb. 10, 2015, entitled MOTORIZED WINDOW TREATMENT, and U.S. Pat. No. 9,115,537, issued Aug. 25, 2015, entitled BATTERY-POWERED ROLLER SHADE SYSTEM, the entire disclosures of which are hereby incorporated by reference The load control system may include other input devices that may operate similar to the input devices described herein. For example, the load control system 200c may include an occupancy sensor 260. The occupancy sensor 260 may be configured to detect occupancy and vacancy conditions in the space in which the load control system 200c is installed. The occupancy sensor 260 may transmit digital messages to the wall-mounted load control device 210 via the RF signals 206 in response to detecting the occupancy or vacancy conditions. The wall-mounted load control device 210 may be configured to turn on the light bulb 212 in response to receiving an occupied command. The wall-mounted load control device 210 may be configured to turn off the respective light bulb in response to receiving a vacant command. The occupancy sensor 260 may operate as a vacancy sensor to turn off (e.g., only turn off) the lighting devices in response to detecting a vacancy condition (e.g., to not turn on the light bulb 212 in response to detecting an occupancy condition). Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The load control system 200c may include a daylight sensor 262. The daylight sensor 262 may be configured to measure a total light intensity in the space in which the load control system is installed. The daylight sensor 262 may transmit digital messages including the measured light intensity to the wall-mounted load control device 210. The daylight sensor 262 may transmit digital messages via the RF signals 206 for controlling the intensities of the light bulb 212 in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control devices (e.g., the lightbulbs 212, 222, the motorized window treatment 220, etc.) receiving the power removal event message and/or power state message may be two-way communication devices. For example, load control devices may receive messages (e.g., power removal event messages and/or power state messages), and/or may acknowledge receipt of the messages (e.g., power removal event messages and/or power state messages) to the transmitting device. The load control devices may identify the power removal event message and/or power state message as being from the hub device 280, a lighting device, and/or the network device 290. The load control devices may identify the hub device 280, a lighting device, and/or a network device 290 by a device identifier (unique identifier).

The input devices (e.g., the occupancy sensor 260, daylight sensor 262, remote control device 250, remote control device 270 etc.) receiving the power removal event message and/or power state message may be one-way or two-way communication devices. The input devices that are one-way communication devices may be unable to receive the power removal event message and/or the power state message. The one-way communication devices may transmit power state information and/or power removal event information. The power state information and/or the power removal event information may include the identifier of the transmitting device. To transmit the power state information and/or power removal event information, a button on the one-way communication device may be actuated or the device may identify a power startup at the device. To trigger the transmission of power state information and/or power removal event information at the daylight sensor 262, a laser signal identifiable by the daylight sensor 262 may be transmitted. Though some control devices may be described as one-way or two-way communication devices, any control device may include a button for transmitting power state information and/or power removal event information.

The control devices (e.g., lighting devices, the battery-powered remote control device 250, the occupancy sensor 260, the daylight sensor 262, the remote control device 270, etc.), the hub device 280, and/or the network device 290 may communicate with one another via one or more communication protocols. For example, the control devices (e.g., lighting devices, the battery-powered remote control device 250, the occupancy sensor 260, the daylight sensor 262, the remote control device 270, etc.) may be capable of communicating with the hub device 280 and/or the network device 290 via wireless signals (e.g., RF signals), such as WI-FI® signals; WIMAX® signals; BLUETOOTH® signals; near field communication (NFC) signals; proprietary communication signals, such as CLEAR CONNECT™; ZIGBEE® signals, Z-WAVE signals, and/or the like. Each device (e.g., each of the control devices, the hub device 280, the network device 290, etc.) may be capable of communicating on the same protocol and/or frequencies. Each device (e.g., each of the control devices, the hub device 280, the network device 290) may be capable of communicating on different protocols and/or frequencies. For example, the occupancy sensor 260 and/or the daylight sensor 262, and the motorized window treatment 230 may communicate via one protocol or frequency (e.g., a proprietary protocol, such as CLEAR CONNECT™), the remote control device 270, the battery-powered remote control device 250, and/or the light bulbs 212, 222 may communicate via one protocol or frequency (e.g., ZIGBEE®, BLUETOOTH, etc.), and/or the network device 290 may communicate via one protocol or frequency (e.g., WI-FI®, cellular, etc.). The occupancy sensor 260, the daylight sensor 262, and/or the motorized window treatment 230 may communicate using the same or different protocol or frequency as the remote control device 270, the battery-powered remote control device 250, and/or the light bulbs 212, 222. An intermediate device (e.g., the hub device 280) may be used to allow communication between one or more devices communicating using one or more communication protocols.

The remote control device 270 may be coupled to and/or cover a switch (e.g., the toggle actuator 216 of the wall-mounted load control device 210) as described above. The control devices (e.g., the remote control device 250, the remote control device 270, lightbulbs 212, 222, the occupancy sensor 260, the daylight sensor 262, the motorized window treatment 230, etc.) may experience a power removal event. Control devices may not receive electrical power from a receptacle (e.g., electrical receptacle 226), which is coupled to remote control device 270. If other control devices are not associated with remote control device 270, the power removal event to the other control devices may be determined to be a local power removal event and/or a system power removal event. To determine whether a power removal event is a local power removal event or a system power removal event, the power states of one or more of the control devices and/or the hub device 280 may be determined. For example, if the light bulb 212 is experiencing a power removal event and one or more of the other control devices is experiencing a power removal event, it may be determined that the power removal event is a system power removal event. If control devices positioned within one or more rooms are experiencing a power removal event, it may be determined that the power removal event is a system power removal event. If the light bulb 212 is not experiencing a power removal event and other control devices are experiencing a power removal event, it may be determined that the power removal event is a local power removal event. Lighting devices and/or the hub device 280 may determine the power states of one or more control devices.

Figure 3:
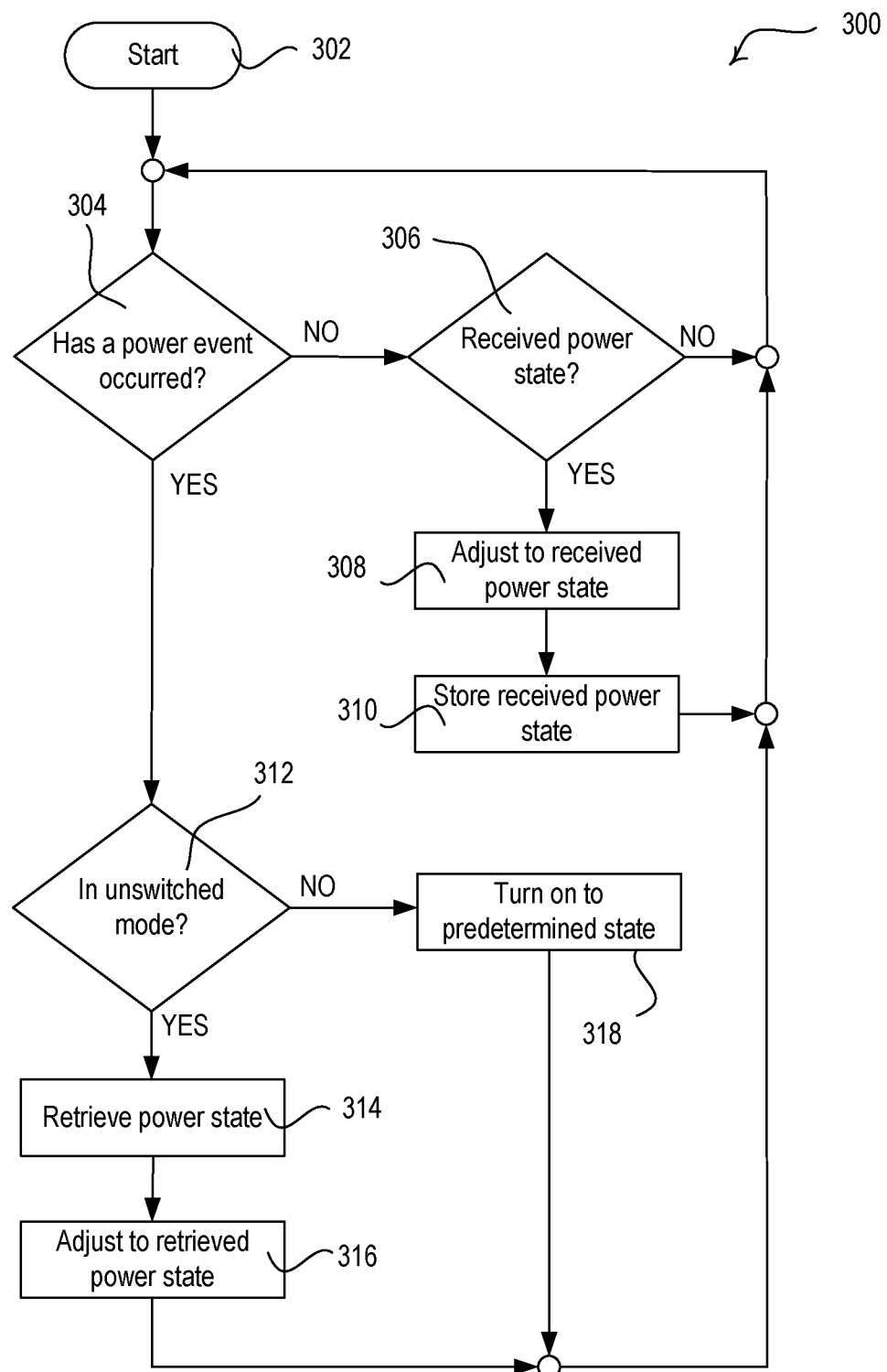
FIGS. 3-5 are simplified flowcharts of example methods for adjusting and/or retaining state information of control devices.

FIG. 3 is a simplified flowchart depicting an example method 300 for retaining and/or adjusting power state information for lighting devices (e.g., the light bulb 212 and/or the light bulb 222). The method 300 may depict an example method for retaining and/or adjusting power state information for lighting devices based on whether an operation mode (e.g., a switched mode) is set. As shown in FIG. 3, the method 300 may begin at 302. At 304, the lighting device and/or the hub device 280 may determine if the lighting device has encountered a power removal event. For example, the lighting device and/or the hub device 280 may determine if the lighting device has encountered a loss of power, such as blackout, a brownout, or another activity that has removed electrical power from the lighting device. The lighting device and/or the hub device 280 may determine information regarding the power removal event. For example, the lighting device and/or the hub device 280 may determine the time at which the power removal event occurred, the time at which power was last regained, the duration of the power removal event, and/or the duration since the power removal event ended.

If the lighting device determines that a power removal event has not occurred, the method may move to 306. At 306, the lighting device may determine whether power state information has been received. The power state information may include an on power state, an off power state, an intensity state, a color state, etc. For example, at 306, the lighting device may determine whether the lighting device has received power state information of an intensity of sixty percent. The power state information may be received via one or more digital messages. For example, a lighting device may receive power state information from a control device, a network device, a hub device, etc.

If power state information is received at 306, the lighting device may adjust its state, at 308. The lighting device may adjust its state based on the received power state information. For example, a lighting device may set its state to an intensity of sixty percent if the device receives a digital message including a request for the lighting device to set its state to an intensity of sixty percent. The lighting device may, at 310, store the received power state information. The lighting device may store the power state internally (e.g., in memory of the lighting device). The lighting device may store the power state externally (e.g., on an external device, such as another lighting device, a hub device, an external server, etc.). The method may return to 304 to determine if a power removal event has occurred.

If, at 304, it is determined that a power removal event has occurred (e.g., the lighting device and/or the hub device 280 determines that a power removal event has occurred), the lighting device and/or the hub device 280 may determine, at 312, whether an operation mode is set. For example, the lighting device and/or the hub device 280 may determine whether a switched mode is set and/or whether an unswitched mode is set. The switched mode may indicate that the lighting device is capable of being controlled by a switch (e.g., the toggle actuator 216 coupled to the wall-mounted load control device 210). The unswitched mode may indicate that the lighting device is incapable of being controlled (e.g., turned off and/or turned on) by a switch, such as toggle actuator 216. If, at 312, the control is not set to the unswitched mode, the lighting device and/or the hub device 280 may set the power state of the lighting device to a predetermined state (e.g., an on power state at a predetermined intensity state) at 318. For example, if the lighting device is not set to the unswitched mode, the lighting device and/or the hub device 280 may set the state of the lighting device to a full intensity level, a defined intensity state, and/or the prior power state. After setting the power state at 318, the method may return to 304 to determine if a power removal event has occurred.

If, at 312, the unswitched mode is set, the method 300 may move to 314. At 314, the lighting device and/or the hub device 280 may retrieve a power state of the lighting device. The power state of the lighting device may be a prior power state of the lighting device (e.g., a power state prior to the power removal event). For example, if the lighting device and/or the hub device 280 determines that a power removal event has occurred, at 304, the lighting device and/or the hub device 280 may retrieve the power state that the lighting device and/or the hub device 280 previously and stored at 310. At 316, the lighting device may adjust its power state to the power state retrieved at 314. As an example, at 316, the lighting device may adjust its power state to an intensity of sixty percent if the prior power state was an intensity of sixty percent. After setting the power state at 316, the method may return to 304 to determine if a power removal event has occurred.

Figure 4:
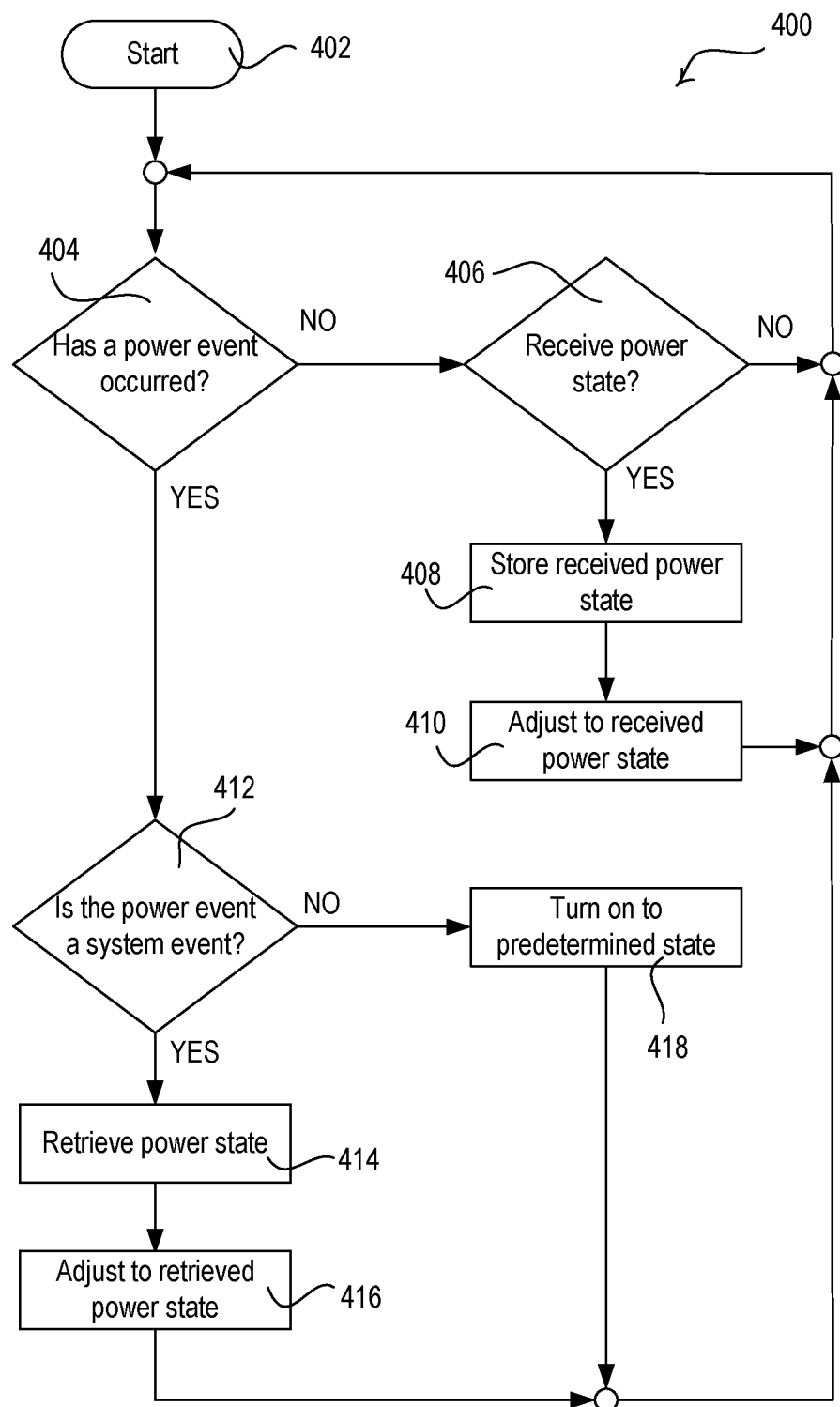

FIG. 4 is a simplified flowchart depicting an example method 400 for retaining and/or adjusting state information (e.g., power state information) of one or more lighting devices (e.g., the light bulb 212 and/or the light bulb 222). The method 400 may depict an example method for retaining and/or adjusting state information of one or more light devices, based on whether a power removal event is a local power removal event or a system power removal event. For example, method 400 may depict an example method for retaining and/or adjusting state information (e.g., power state information) of lighting devices using a hub device (such as the hub device 280). As shown in FIG. 4, the method 400 may begin at 402. At 404, the hub device may determine if the lighting device has encountered a power removal event. For example, the hub device may determine if the lighting device has encountered a blackout, a brownout, or another activity (such as a user physically turning off a switch to a lighting load) that has removed electrical power from the lighting device. The hub device may determine information regarding the power removal event. For example, the hub device may determine the time at which the power removal event occurred, the duration of the power removal event, and/or the duration since the power removal event ended.

If the hub device determines that a power removal event has not occurred, the method may move to 406. At 406, it may be determined whether power state information is received. The power state information may include information relating to the power state of the hub device 280, and/or the power state information may include information relating to the power state of one or more lighting devices. The power state information may include an on power state, an off power state, an intensity state, a color state, etc. For example, at 406, the lighting device may determine whether the hub device and/or the lighting device has received power state information of an intensity of sixty percent. The power state information may be received via one or more digital messages. For example, a lighting device may receive power state information from a control device, a network device, a hub device, etc.

If power state information is received at 406, the received power state information may be stored at 408. The lighting device may store the power state internally (e.g., in memory of the lighting device). The power state may be stored externally (e.g., on an external device, such as another lighting device, a hub device, an external server, etc.).

If power state information is received at 406, the lighting device may adjust its power state at 410. The lighting device may adjust its power state based on the received power state information. For example, a lighting device may set its state to an on power state if the lighting device receives a digital message including a request for the lighting device to set its state to an on power state. If the power state information is not received at 406, or is received and the lighting device has performed adjustments, the method 400 may return to 404 to determine if a power removal event has occurred.

If, at 404, it is determined that a power removal event has occurred (e.g., the hub device 280 determines that a power removal event has occurred), the hub device 280 may determine, at 412, whether the power removal event is a system power removal event, at 412. The hub device 280 may determine that a power removal event is a system power removal event (e.g., a brownout and/or a blackout) by querying lighting devices positioned at different locations and/or by querying lighting devices that are within groups positioned at different locations. For example, the hub device 280 may query lighting devices connected to different circuits (e.g., AC circuits) to determine if the power removal event is a system power removal event (e.g., a power removal event affecting more than one AC circuit, such as a brownout or blackout) and/or whether the power removal event is a local power removal event (e.g., a power removal event affecting a single AC circuit, such as when a user physically turns off a switch to a lighting device, for example).

If, at 412, the power removal event is determined to not be a system power removal event, the lighting device may set the state of the control device to a predetermined state (e.g., an on power state at a predetermined intensity state), at 418. For example, if the power removal event is determined to not be a system power removal event, the lighting device may set the state of the lighting device to a full intensity level, a defined intensity state, and/or the prior power state. After setting the power state at 418, the method may return to 404 to determine if a power removal event has occurred If, at 412, the power removal event is determined to be a system power removal event, move to 414. At 414, the lighting device may retrieve a power state of the lighting device. The power state of the lighting device may be a prior power state of the lighting device (e.g., a power state prior to the power removal event). For example, if the lighting device and/or the hub device 280 determines that a system power removal event has occurred, at 410, the lighting device and/or the hub device 280 may retrieve the power state that the lighting device previously stored at 410. At 416, the lighting device may adjust its power state to the power state retrieved at 414. As an example, at 416, the lighting device may adjust its power state to an intensity of sixty percent if the prior power state was an intensity of sixty percent. After setting the power state at 416, the method may return to 404 to determine if a power removal event has occurred.

Figure 5:
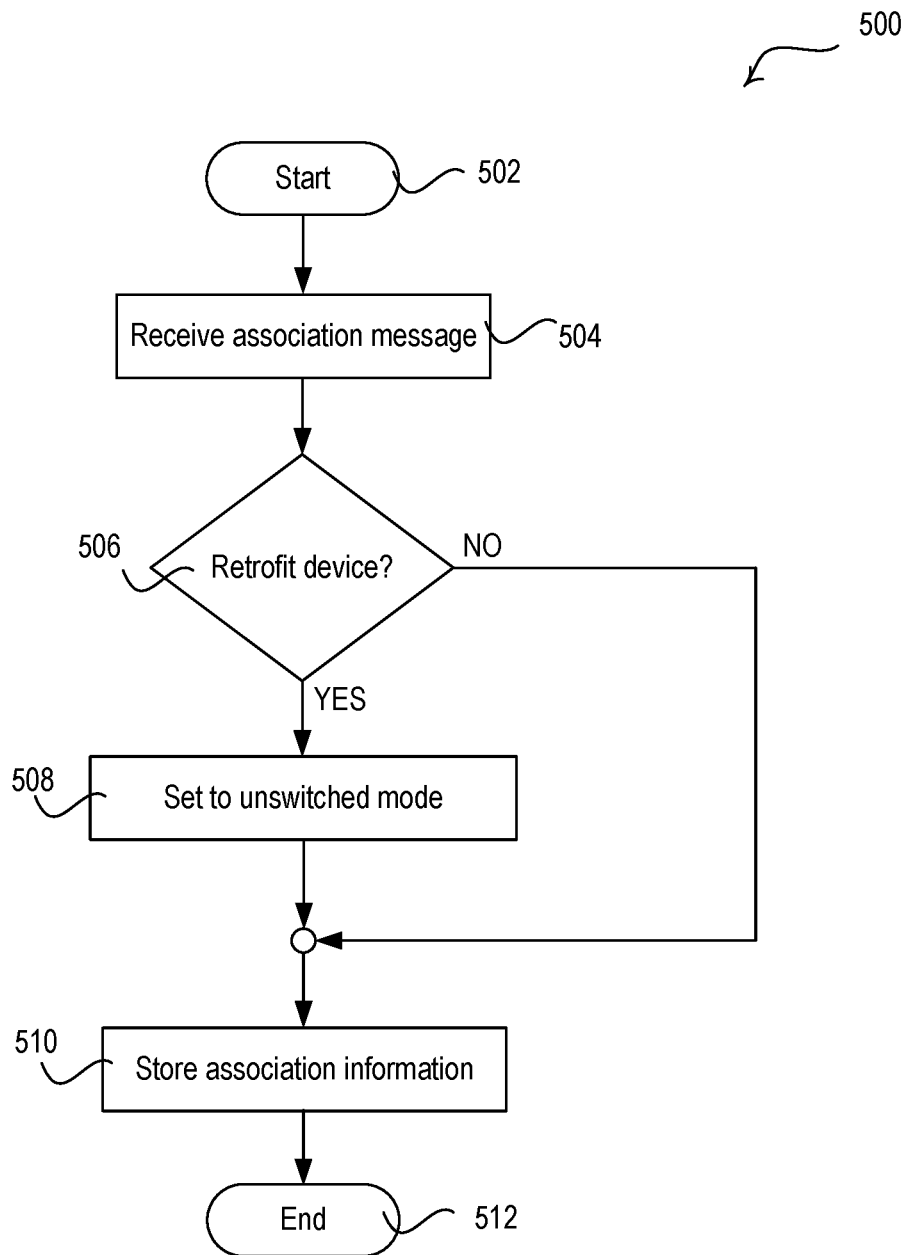

FIG. 5 is a simplified flowchart depicting an example method 500 for associating a lighting device (e.g., the light bulb 212 and/or the light bulb 222) with a retrofit remote control device (e.g., the retrofit remote control device 270). For example, the method 500 may be executing by the lighting device for determining whether state information (e.g., power state information) of one or more control devices is to be adjusted and/or retained, based on the use of the retrofit remote control device 270. The retrofit remote control device may be configured to be coupled to a toggle actuator of a light switch (e.g., the toggle actuator 216 of the wall-mounted load control device 210) that is coupled in series electrical connection with the lighting device. The retrofit remote control device may be configured to retain the light switch in an on position. The retrofit remote control device may communicate with the lighting device, for example, via one or more of the devices via wireless signals, e.g., radio-frequency (RF) signals 206 (e.g., ZIGBEE®; NFC; BLUETOOTH®; WI-FI®; or a proprietary communication channel, such as CLEAR CONNECT™, etc.).

As shown in FIG. 5, the method 500 may begin at 502. At 504, an association message may be received. For example, at 504, the lighting device may receive an association message. The association message may be sent by one or more devices. For example, the association message may be sent by control devices (e.g., lighting devices, remote control devices, etc.) and/or hub devices.

The association message may be transmitted from a device in an association mode. The association message may indicate a unique identifier of the device and/or a device type from which the association message is transmitted. For example, an association message from a lighting device may indicate that the message is from a lighting device, an association message from a wall-mounted dimmer may indicate that the message is from a wall-mounted dimmer, and/or an association message from a retrofit remote control device may indicate that the message is from a retrofit remote control device. The device type may be indicated by the unique identifier, or a separate identifier. The association message may indicate the location of the device in the load control system from which the association message is received. The association message may identify the devices that are coupled to and/or associated with the device from which the association message is sent. For example, a device may send association information, including the identification of devices and/or device types, stored on the device during association and from which the device may receive digital messages for performing control.

At 506, it may be determined if the association message was received from a retrofit remote control device. The association message may indicate the other control devices with which the retrofit device is associated. For example, if the lighting device receives an association message from a retrofit remote control device during an association mode, the lighting device may be associated with the retrofit device. The lighting device may also identify the retrofit remote control device as being previously associated with another lighting device from association information indicating previous associations. Based on the association information, the lighting device may determine the location of the retrofit remote control device and/or the other control devices (e.g., lighting devices) to which the retrofit remote control device is associated.

If, at 506, it is determined that a retrofit device is not being used, the method 500 may move to 510. If, at 506, it is determined that a retrofit device is being used, an operation mode may be set at 508 (e.g., an unswitched mode may be set). The unswitched mode may indicate that the lighting device is incapable of being controlled (e.g., turned off and/or turned on) by a switch (e.g., the wall-mounted load control device 210 shown in FIG. 2). For example, the unswitched mode may indicate that the lighting device is not downstream of a light switch that is capable of being switched off at the time. The unswitched mode may indicate that the lighting device is downstream of a light switch to which a retrofit remote control device is mounted, where the retrofit remote control device may retain the light switch in the on position.

At 510, association information received in the association message at 504 may be stored. For example, at 510, a unique identifier (e.g., serial number) of the retrofit remote control device and/or the associated control devices (e.g., a lighting device, such as light bulb 212) may be stored. The association information may include the unique identifier (e.g., serial number) of other devices, the device types, locations, etc. of devices. The association information may be stored by the hub device 280, a lighting device, and/or the network device 290. The association information may be stored so that the hub device 280, the lighting devices, and/or the network device 290 may determine the control devices that are associated with a retrofit remote control device. The association information may be stored so that the hub device 280, the lighting devices, and/or the network device 290 may identify the control devices that are unassociated with a retrofit remote control device.

If a control device (e.g., lighting device) is associated with a retrofit remote control device, the control device may be determined to have experienced a system power removal event if the control device experiences a power removal event. For example, if the light bulb 212 is associated with the retrofit remote control device 270 and the light bulb 212 experiences a power removal event, it may be determined that the light bulb 212 has experienced a system power removal event. The light bulb 212 may be determined to have experienced a system power removal vent because the retrofit remote control device 270 is configured to maintain the toggle actuator 216 of the wall-mounted remote control device 210 in the on position and the power state of the light bulb 212 in the on power state. For example, if the retrofit remote control device 270 is configured to prevent a user from actuating the toggle actuator 216 in the on position and the wall-mounted remote control device from turning off the light bulb 212, the light bulb 212 may be turned to an off power state during a system power removal event (e.g., brownout, blackout, etc.). The light bulb 212 may be prevented from being turned off based on a local power removal event (e.g., turning the toggle actuator 216 to the off position). If the light bulb 212, other lighting devices, and/or the hub device 280 determines that the light bulb 212 has experienced a power removal event, the light bulb 212, the other lighting devices, and/or the hub device 280 may determine that the power removal event of the light bulb 212 is a system power removal event. The method may end at 512.

Figure 6:
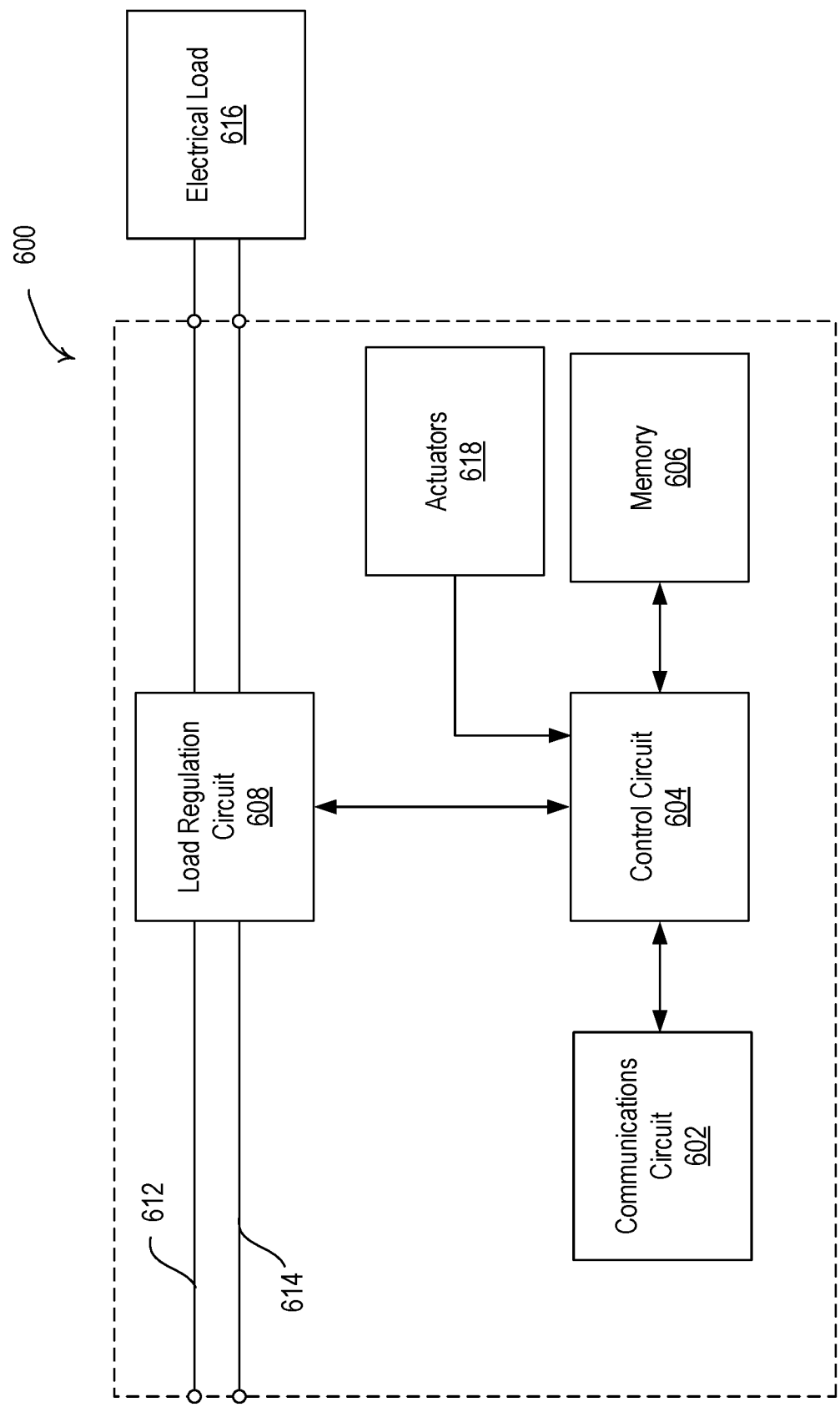
FIG. 6 is a block diagram of an example load control device.

FIG. 6 is a block diagram illustrating an example control device 600, e.g., a load control device, as described herein. The control device 600 may be a lighting device (e.g., the light bulb 212, such as shown in FIG. 2). The control device 600 may be a dimmer device, an electronic switch, an electronic ballast for lamps, an LED driver for LED light sources, an AC plug-in control device, a temperature control device (e.g., a thermostat), a motor drive unit for a motorized window treatment, or other control device. The control device 600 may comprise a load regulation circuit 608 that may control an electrical load 616. The electrical load 616 may include any type of electrical load. For example, the electrical load may be a lighting load and/or a lighting device. The load regulation circuit 608 may receive power via a hot connection 612 and a neutral connection 614 (e.g., for connection to a power source, such as an AC power source) and may provide an amount of power to the electrical load 616. When the control device 600 is a light bulb (e.g., such as the light bulb 212 and/or the light bulb 222), the electrical load 616 may be integral to the control device 600. When the control device 600 is a light bulb and the electrical load is, for example, an LED light source, the load regulation circuit 608 may comprise an LED drive circuit. When the control device 600 is a dimmer device (e.g., such as dimmer device 218, shown in FIG. 2B), the electrical load 616 may be external to the control device (e.g., as shown in FIG. 6) and the control device may be coupled to the electrical load via a single electrical connection. The electrical load 616 may be coupled to the neutral side of the AC power source, and the control device 600 may not include the neutral connection 614 to the neutral side of the AC power source. When the control device 600 is a dimmer device, the load regulation circuit 608 may comprise a dimming circuit for controlling the power delivered to the electrical load using a phase-control technique. The control circuit 604 may determine the status of the electrical load 616 in response to status feedback received from the load regulation circuit 608.

The control device 600 may comprise a control circuit 604 that may control the load regulation circuit 608 for controlling the electrical load 616. The control circuit 604 may include one or more general purpose processors, special purpose processors, conventional processors, digital signal processors (DSPs), microprocessors, integrated circuits, a programmable logic device (PLD), application specific integrated circuits (ASICs), or the like. The control circuit 604 may perform signal coding, data processing, power control, input/output processing, or any other functionality that enables the control device 600 to perform as described herein. The control device 600 may include a communications circuit 602. The communications circuit 602 may include an RF transceiver or other communications module capable of performing wired and/or wireless communications via a communications link (e.g., a wireless or wired communication link). The communications circuit 602 may be in communication with the control circuit 604.

The control circuit 604 may store information in and/or retrieve information from the memory 606. For example, the memory 606 may maintain a registry of associated control devices and/or control configuration instructions. The memory 606 may include a non-removable memory and/or a removable memory.

The control circuit 604 may be in communication with actuators 618 (e.g., one or more buttons) that may be actuated by a user to communicate user selections to the control circuit 604. For example, the actuators 618 may be actuated to put the control circuit 604 in an association mode and/or communicate association messages from the control device 600.

Figure 7:
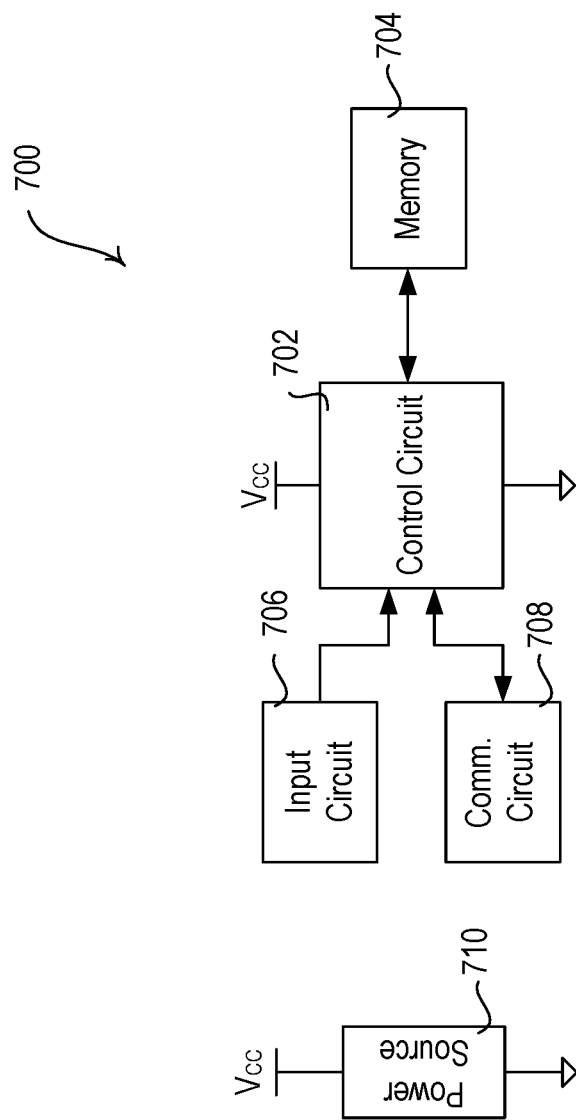
FIG. 7 is a block diagram of an example input device.

FIG. 7 is a block diagram illustrating an example input device 700 as described herein. The input device 700 may be a remote control device (such as remote control device 250 and/or remote control device 270), an occupancy sensor, a daylight sensor, a window sensor, a temperature sensor, and/or the like. The input device 700 may include a control circuit 702 for controlling the functionality of the input device 700. The control circuit 702 may include one or more general purpose processors, special purpose processors, conventional processors, digital signal processors (DSPs), microprocessors, integrated circuits, a programmable logic device (PLD), application specific integrated circuits (ASICs), or the like. The control circuit 702 may perform signal coding, data processing, power control, input/output processing, or any other functionality that enables the input device 700 to perform as described herein.

The control circuit 702 may store information in and/or retrieve information from the memory 704. The memory 704 may include a non-removable memory and/or a removable memory, as described herein.

The input device 700 may include a communications circuit 708 for transmitting and/or receiving information. The communications circuit 708 may transmit and/or receive information via wired and/or wireless communications. The communications circuit 708 may include a transmitter, an RF transceiver, or other circuit capable of performing wired and/or wireless communications. The communications circuit 708 may be in communication with control circuit 702 for transmitting and/or receiving information.

The control circuit 702 may also be in communication with an input circuit 706. The input circuit 706 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the input device 700 may receive input from the input circuit 706 to put the control circuit 702 in an association mode and/or communicate association messages from the input device 700. The control circuit 702 may receive information from the input circuit 706 (e.g. an indication that a button has been actuated or sensed information). Each of the modules within the network device 700 may be powered by a power source 710.

Figure 8:
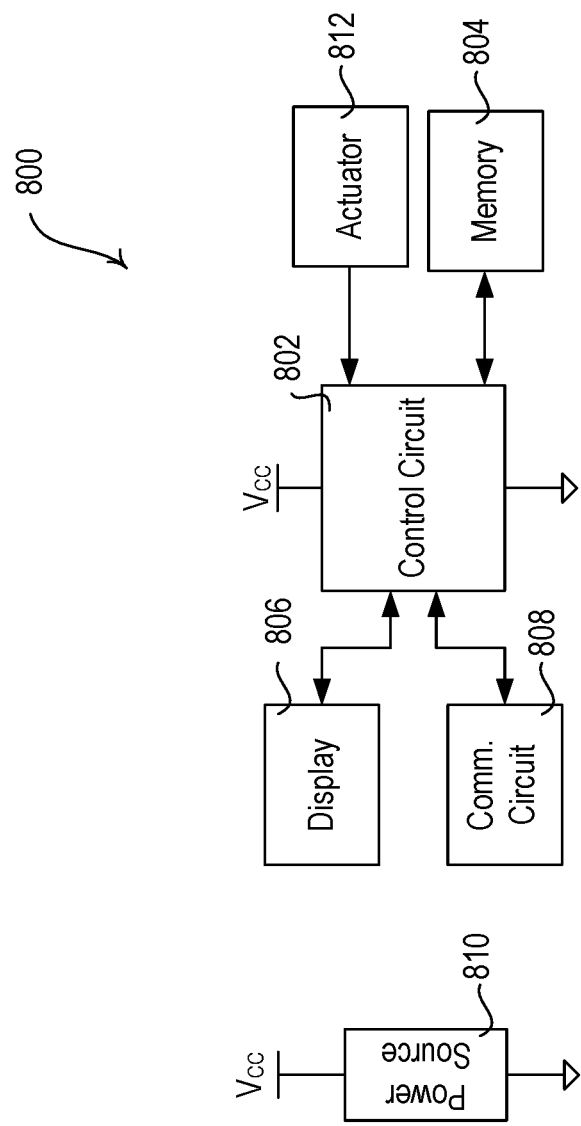
FIG. 8 is a block diagram of an example network device.

FIG. 8 is a block diagram illustrating an example network device 800 as described herein. The network device 800 may include the network device 290, shown in FIGS. 2A-2D, for example. The network device 800 may include a control circuit 802 for controlling the functionality of the network device 800. The control circuit 802 may include one or more general purpose processors, special purpose processors, conventional processors, digital signal processors (DSPs), microprocessors, integrated circuits, a programmable logic device (PLD), application specific integrated circuits (ASICs), or the like. The control circuit 802 may perform signal coding, data processing, power control, input/output processing, or any other functionality that enables the network device 800 to perform as described herein. The control circuit 802 may store information in and/or retrieve information from the memory 804. The memory 804 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 800 may include a communications circuit 808 for transmitting and/or receiving information. The communications circuit 808 may perform wireless and/or wired communications. The communications circuit 808 may include an RF transceiver or other circuit capable of performing wireless communications via an antenna. Communications circuit 808 may be in communication with control circuit 802 for transmitting and/or receiving information.

The control circuit 802 may also be in communication with a display 806 for providing information to a user. The processor 802 and/or the display 806 may generate GUIs for being displayed on the network device 800. The display 806 and the control circuit 802 may be in two-way communication, as the display 806 may include a touch screen module capable of receiving information from a user and providing such information to the control circuit 802. The network device may also include an actuator 812 (e.g., one or more buttons) that may be actuated by a user to communicate user selections to the control circuit 802.

Each of the modules within the network device 800 may be powered by a power source 810. The power source 810 may include an AC power supply or DC power supply, for example. The power source 810 may generate a supply voltage $V_{CC}$ for powering the modules within the network device 800.

Figure 9:
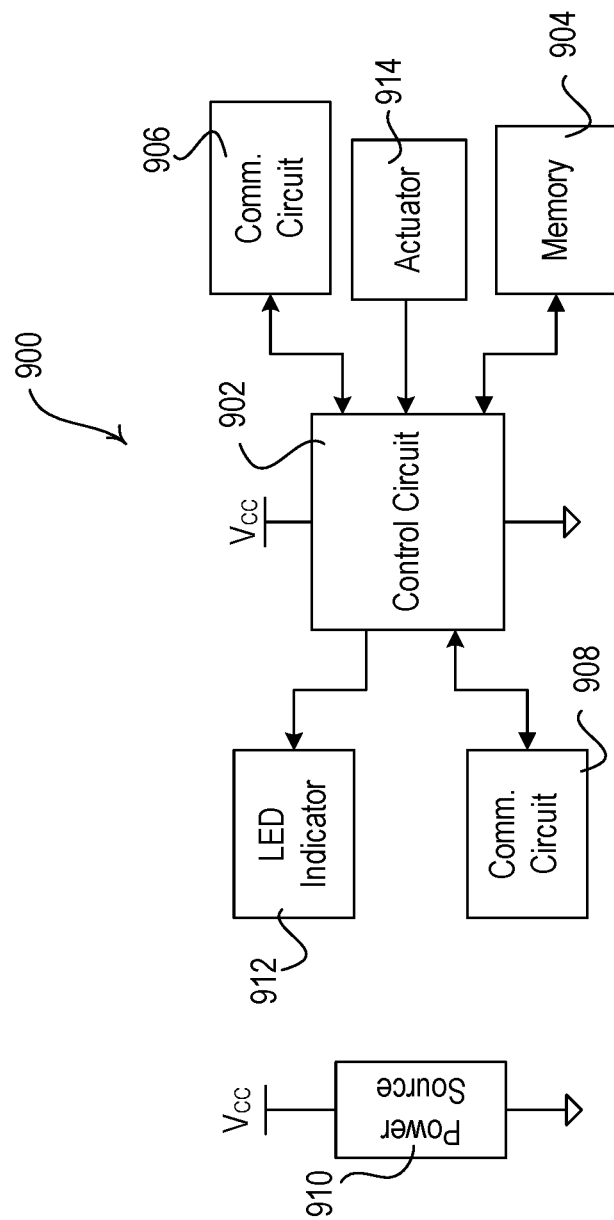
FIG. 9 is a block diagram of an example hub device.

FIG. 9 is a block diagram illustrating an example hub device 900 as described herein. The hub device 900 may include a control circuit 902 for controlling the functionality of the hub device 900. The control circuit 902 may include one or more general purpose processors, special purpose processors, conventional processors, digital signal processors (DSPs), microprocessors, integrated circuits, a programmable logic device (PLD), application specific integrated circuits (ASICs), or the like. The control circuit 902 may perform signal coding, data processing, power control, input/output processing, or any other functionality that enables the hub device 900 to perform as described herein. The control circuit 902 may store information in and/or retrieve information from the memory 904. The memory 904 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The hub device 900 may include a communications circuit 906 for transmitting and/or receiving information. The communications circuit 906 may perform wireless and/or wired communications. The hub device 900 may also, or alternatively, include a communications circuit 908 for transmitting and/or receiving information. The communications circuit 906 may perform wireless and/or wired communications. Communications circuits 906 and 908 may be in communication with control circuit 902. The communications circuits 906 and 908 may include RF transceivers or other communications modules capable of performing wireless communications via an antenna. The communications circuit 906 and communications circuit 908 may be capable of performing communications via the same communication channels or different communication channels. For example, the communications circuit 906 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 908 may be capable of communicating (e.g., with control devices and/or other devices in the load control system) via another wireless communication channel (e.g., WI-FI® or a proprietary communication channel, such as CLEAR CONNECT™).

The control circuit 902 may be in communication with an LED indicator 912 for providing indications to a user. The control circuit 902 may be in communication with an actuator 914 (e.g., one or more buttons) that may be actuated by a user to communicate user selections to the control circuit 902. For example, the actuator 914 may be actuated to put the control circuit 902 in an association mode and/or communicate association messages from the hub device 900.

Each of the modules within the hub device 900 may be powered by a power source 910. The power source 910 may include an AC power supply or DC power supply, for example. The power source 910 may generate a supply voltage $V_{CC}$ for powering the modules within the hub device 900.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. A lighting device comprising:
a load regulation circuit configured to control a lighting load;
a communication circuit configured to transmit and receive messages to and from other devices; and
a control circuit configured to:
receive an association message from a remote control device;
determine that the remote control device is a retrofit remote control device configured to be mounted over a toggle actuator;
determine to operate in an unswitched mode in response to the determination that the remote control device is the retrofit remote control device;
determine, based on a loss of power at the lighting device when operating in the unswitched mode, that the lighting device has experienced a system power removal event; and
in response to the determination that the lighting device has experienced the system power removal event, adjust a power state of the lighting device to a prior power state.

2. The lighting device of claim 1, wherein the prior power state is a power state of the lighting device prior to the lighting device experiencing the system power removal event.

3. The lighting device of claim 1, wherein the prior power state is a predetermined power state of the lighting device.

4. The lighting device of claim 3, wherein the predetermined power state comprises a predetermined intensity level.

5. The lighting device of claim 1, wherein the lighting device comprises a memory configured to store the prior power state.

6. The lighting device of claim 5, further configured to:
retrieve, from the memory, the prior power state; and
send, via the communication circuit, an indication of the retrieved prior power state, wherein the indication of the retrieved prior power state is configured to cause the lighting device to adjust the power state of the lighting device to the retrieved prior power state.

7. A method comprising:
determining, based on contents of a received message, that an external device has experienced a loss of power;
determining that the external device is associated with a retrofit device configured to be mounted over a toggle actuator;
determining, based on the loss of power at the external device and the association of the external device with the retrofit device, that the external device experienced a system power removal event; and
in response to the determination that the external device experienced the system power removal event, sending a power removal event indication indicating that the loss of power experienced by the external device is the system power removal event, wherein the power removal event indication is configured to cause the external device to adjust to a prior power state.

8. The method of claim 7, wherein the prior power state is a power state of the external device prior to the external device experiencing the system power removal event.

9. The method of claim 7, wherein the prior power state is a predetermined power state of the external device.

10. The method of claim 9, wherein the predetermined power state comprises a predetermined intensity level.

11. The method of claim 7, further comprising storing in a memory of a control device the prior power state of the external device.

12. The method of claim 11, further comprising:
retrieving, from the memory, the prior power state of the external device; and
sending, to the external device, an indication of the retrieved prior power state of the external device, wherein the indication of the retrieved prior power state of the external device is utilized to adjust the power state of the external device to the prior power state.

13. At least one computer-readable storage medium comprising executable instructions for configuring at least one processor to:
determine, based on contents of a received message, that an external device has experienced a loss of power;
determine that the external device is associated with a retrofit device configured to be mounted over a toggle actuator;
determine, based on the loss of power at the external device and the association of the external device with the retrofit device, that the external device experienced a system power removal event; and
in response to the determination that the external device experienced the system power removal event, send a power removal event indication to the external device indicating that the loss of power experienced by the external device is the system power removal event, wherein the power removal event indication is configured to cause the external device to adjust to a prior power state.

14. The at least one computer-readable storage medium of claim 13, wherein the prior power state is a power state of the external device prior to the external device experiencing the system power removal event.

15. The at least one computer-readable storage medium of claim 13, wherein the prior power state is a predetermined power state of the external device.

16. The at least one computer-readable storage medium of claim 15, wherein the predetermined power state comprises a predetermined intensity level.

17. The at least one computer-readable storage medium of claim 13, wherein a control device comprises a memory configured to store the prior power state of the external device.

18. The at least one computer-readable storage medium of claim 17, the executable instructions further for configuring the at least one processor to:
retrieve, from the memory, the prior power state of the external device; and
send, to the external device, an indication of the retrieved prior power state of the external device, wherein the indication of the retrieved prior power state of the external device is configured to cause the external device to adjust the power state of the external to the retrieved prior power state.

* * * * *